United States Patent
Tochio

[19]

[11] Patent Number: 6,069,892
[45] Date of Patent: May 30, 2000

[54] FIXED-LENGTH CELL TRANSMISSION SYSTEM, FIXED-LENGTH CELL TRANSMITTING UNIT, AND FIXED-LENGTH CELL RECEIVING UNIT

[75] Inventor: Yuji Tochio, Kawasaki, Japan

[73] Assignee: Fujitsu Limited, Kawasaki, Japan

[21] Appl. No.: 08/901,335

[22] Filed: Jul. 28, 1997

[30] Foreign Application Priority Data

Mar. 17, 1997 [JP] Japan .................................. 9-0630240

[51] Int. Cl.$^7$ .............................. H04L 12/28; H04J 3/16; H04J 14/08
[52] U.S. Cl. .......................... 370/395; 370/465; 359/135
[58] Field of Search ................................... 370/216, 221, 370/217, 218, 219, 220, 395, 465, 468, 252, 225, 227, 228; 359/139, 151, 135, 123, 133

[56] References Cited

U.S. PATENT DOCUMENTS

| | | | |
|---|---|---|---|
| 4,427,895 | 1/1984 | Eng .......................................... | 250/551 |
| 5,493,573 | 2/1996 | Kobayashi et al. ........................ | 370/60 |
| 5,600,469 | 2/1997 | Yamazaki ................................ | 359/135 |
| 5,604,734 | 2/1997 | Buhrgard ................................. | 370/388 |
| 5,610,913 | 3/1997 | Tomonaga et al. ...................... | 370/219 |
| 5,673,129 | 9/1997 | Mizrahi .................................. | 359/124 |
| 5,712,847 | 1/1998 | Hata ....................................... | 370/228 |
| 5,781,537 | 7/1998 | Ramaswami et al. .................. | 370/254 |
| 5,862,140 | 1/1999 | Shen et al. .............................. | 370/468 |
| 5,878,029 | 3/1999 | Hasegawa et al. ...................... | 370/236 |
| 5,886,803 | 3/1999 | Yamamoto et al. ..................... | 359/152 |
| 5,886,982 | 3/1999 | Kozaki et al. .......................... | 370/399 |

Primary Examiner—Ajit Patel
Assistant Examiner—Brian Nguyen
Attorney, Agent, or Firm—Staas & Halsey, LLP

[57] ABSTRACT

The present invention relates to a fixed-length cell transmission system, a fixed-length cell transmitting unit and a fixed-length cell receiving unit. The fixed-length cell transmitting unit determines at least one optical transmitting section to be put to use, on the basis of band information of an inputted fixed-length cell to drive that optical transmitting section and sends the inputted fixed-length cell to that optical transmitting section. The fixed-length cell receiving unit is coupled through an optical transmission line to the fixed-length cell transmitting unit and is equipped with a plurality of optical receiving sections for converting a fixed-length cell of an optical signal into an electric signal and outputting the converted electric signal. In addition, the fixed-length cell receiving unit drives the optical receiving section corresponding to the optical transmitting section to be put to use in the fixed-length cell transmitting unit. The optical transmitting section and the optical receiving section are determined in accordance with the operating band at the transmission. Accordingly, this arrangement allows effective and flexible transmission of fixed-length cells.

17 Claims, 15 Drawing Sheets

FIXED-LENGTH CELL TRANSMISSION SYSTEM, FIXED-LENGTH CELL TRANSMITTING UNIT, AND FIXED-LENGTH CELL RECEIVING UNIT

BACKGROUND OF THE INVENTION (1) Field of the Invention

The present invention relates to a fixed-length cell transmission system, a fixed-length cell transmitting unit, and a fixed-length cell receiving unit, and more particularly to a fixed-length cell transmission system, a fixed-length cell transmitting unit, and a fixed-length cell receiving unit suitable for an ATM (Asynchronous Transfer Mode) optical transmission technique (an asynchronous optical transmission network) which deals with fixed-length data (cell) called an ATM cell.

As well known, the ATM transmission technique has become a center of attraction as a means capable of realizing a broad-band communication network, and particularly with the recent progress of the optical transmission technique, interest has been shown toward, for example, the ATM optical transmission technique based upon an optical wavelength multiplexing technique which allows an effective utilization (band broadening) of an operating (using) frequency band per one optical fiber by wavelength-multiplexing data (ATM cell) including a plurality of different light-wavelength information.

(2) Description of the Related Art

FIG. 15 is a block diagram showing one example of ATM cell transmission system, and as illustrated, the ATM cell transmission system, for example, has a demultiplexing unit 101 located on a center side and equipped with an ATM exchange (not shown) and a multiplexing unit 102, called an RT (Remote Terminal), situated on a subscriber (user) side.

Furthermore, as shown in FIG. 15, the demultiplexing unit (fixed-length cell transmitting unit) 101 is composed of a demultiplexing section (DMUX) 103 and a plurality of electric/optic conversion sections (E/O) 104-1 to 104-n (where n designates a natural number), whereas the multiplexing unit (fixed-length cell receiving unit) 102 includes optic/electric conversion sections (O/E) 105-1 to 105-n respectively corresponding to the electric/optic conversion sections (E/O) 104-1 to 104-n and a multiplexing section (MUX) 106.

In this system, the demultiplexing section 103 of the demultiplexing unit 101 is for the purpose of separating or demultiplexing input data to distribute ATM cell data received in the form of a metallic signal (electric signal) from the ATM exchange side to the electric/optic conversion sections 104-i (where i=1 to n) in accordance with its VPI (Virtual Path Identifier)/VCI (Virtual Channel Identifier). Each of the electric/optic conversion sections (optical transmitting sections) 104-i converts input data into an optical signal having a given wavelength $\lambda i$.

In this case, the data converted into the optical signals in the electric/optic conversion sections 104-i are wavelength-multiplexed and transmitted through one optical transmission line 107.

On the other hand, in the multiplexing unit 102, each of the optic/electric conversion sections (optical receiving sections) 105-i converts the optical signal with the wavelength $\lambda i$, inputted through the optical transmission line 107, into a metallic signal, while the multiplexing section 106 outputs the metallic signals (ATM cell) from the respective optic/electric conversion sections 105-i in a time-division way for multiplexing, with the multiplexed signals being forwarded to the user side.

A brief description of the aforesaid ATM cell transmission system (ATM transmission technique based upon the light-wavelength multiplexing technique) is to say that, for the optic-electric conversion of the data (ATM cell) to be transmitted, the entire operating band is divided into the transmission rates (bands $\lambda 1$ to $\lambda n$) of the optical transmitting sections 104-i (the optical receiving sections 105-i) and transmitted. In this case, the whole transmission rate becomes constant irrespective of the presence or absence of information.

With such an arrangement, the above-described ATM cell transmission system can accomplish the transmission of data from the center side through the optical transmission line 107 between the demultiplexing unit 101 and the multiplexing unit 102 with an extremely high efficiency. Accordingly, for example, if the multiplexing unit 102 is disposed in the vicinity of the user, the data from the center can advance through the optical transmission line 107 to the vicinity of the user with almost no loss.

On the other hand, since in general the ATM transmission technique makes the operating band vary on all such occasions, the optical section equivalent to the physical layer portion may allow data transmission without the need for use of all the optical transmitting sections 104-i under certain circumstances. However, since the rule of the above-mentioned ATM cell transmission system is that the supply of information falling under a constant band always comes about, it needs such an operation as to send a vacant cell from a portion of the optical transmitting sections 104-i. This not only leads to increase in power consumption of the whole system but also makes it difficult to effectively make the most of the flexible transmission technique relying upon the VP/VC producing the characteristic of the ATM.

SUMMARY OF THE INVENTION

Accordingly, taking these problems into consideration, it is an object of the present invention to provide a fixed-length cell transmission system, a fixed-length cell transmitting unit and a fixed-length cell receiving unit which are capable of flexibly conducting the transmission of a fixed-length cell with a high efficiency in a manner that an optical transmitting section and optical receiving section to be used are determined in accordance with an operating band at the transmission of data (fixed-length cell).

For this purpose, in accordance with an aspect of the present invention there is provided a fixed-length cell transmission system comprising:

a fixed-length cell transmitting unit including an exchange section made to be allowed to receive a fixed-length cell as an electric signal and further to output the fixed-length cell to any one of a plurality of exit ports and a plurality of optical transmitting sections respectively coupled to the exit ports of the exchange section for converting the fixed-length cell being an electric signal into an optical signal and for outputting the conversion result, wherein band information is measured from the fixed-length cell of the electric signal inputted to selectively determine at least one, put to use, from among the plurality of optical transmitting sections on the basis of the measurement result, and the optical transmitting section to be put to use is placed into a driven condition whereas the fixed-length cell inputted to the exchange section is outputted to the exit port coupled to the optical transmitting section to be in use; and a fixed-length cell receiving unit connected through an optical transmission line to the fixed-length cell transmitting unit, and including a plurality of optical receiving sections each of which converts the fixed-length cell of the optical signal into an electric signal and which outputs the converted electric signal, the fixed-length cell receiving unit driving the optical receiving section corresponding to the optical transmitting section to be used in the fixed-length cell transmitting unit.

Furthermore, in accordance with another aspect of this invention, there is provided a fixed-length cell transmitting unit comprising:

an exchange section made to receive a fixed-length cell as an electric signal and further to output the fixed-length cell to any one of a plurality of exit ports;

a plurality of optical transmitting sections respectively coupled to the exit ports of the exchange section to convert the fixed-length cell of the electric signal into a optical signal and to output the converted optical signal; and a band measuring and controlling section for measuring band information from the fixed-length cell of the electric signal inputted, for selectively determining the optical transmitting section(s), put to use, from among the plurality of optical transmitting sections on the basis of the measurement result, for driving the optical transmitting section to be in use, and further for outputting the fixed-length cell, inputted to the exchange section, to the exit port connected to the optical transmitting section to be used.

Still further, in accordance with a further aspect of this invention, there is provided a fixed-length cell receiving unit coupled through an optical transmission line to a fixed-length cell transmitting unit including a plurality of optical transmitting sections for converting a fixed-length cell of an electric signal into an optical signal and for outputting the optical signal, with band information being measured from the fixed-length cell of the electric signal inputted to selectively determine at least one, put to use, from among the plurality of optical transmitting sections on the basis of the measurement result and with the determined optical transmitting section being placed into operation, the fixed-length cell receiving unit comprising:

a plurality of optical receiving sections for converting the fixed-length cell of the optical signal into an electric signal and outputting the converted electric signal; and a reception controlling section for driving the optical receiving section corresponding to the optical transmitting section to be used in the fixed-length cell transmitting unit.

Thus, according to this invention, the transmission side drives only the optical transmitting section, necessary for data (fixed-length cell) transmission, on the basis of the band information of the input fixed-length cell, whereas the reception side drives only the optical receiving section corresponding to the optical transmitting section driven on the transmission side. Now that effective data transmission is feasible with the use of only the optical transmitting section and the optical receiving section necessary for the data transmission and without the need for transmission of a vacant cell or the like, the considerable reduction in the power consumption of the entire system is possible and even flexible fixed-length cell transmission is practicable.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION (a) Description of Aspect of the Invention First of all, an aspect of the present invention will be described hereinbelow with reference to the drawings.

Figure 1:
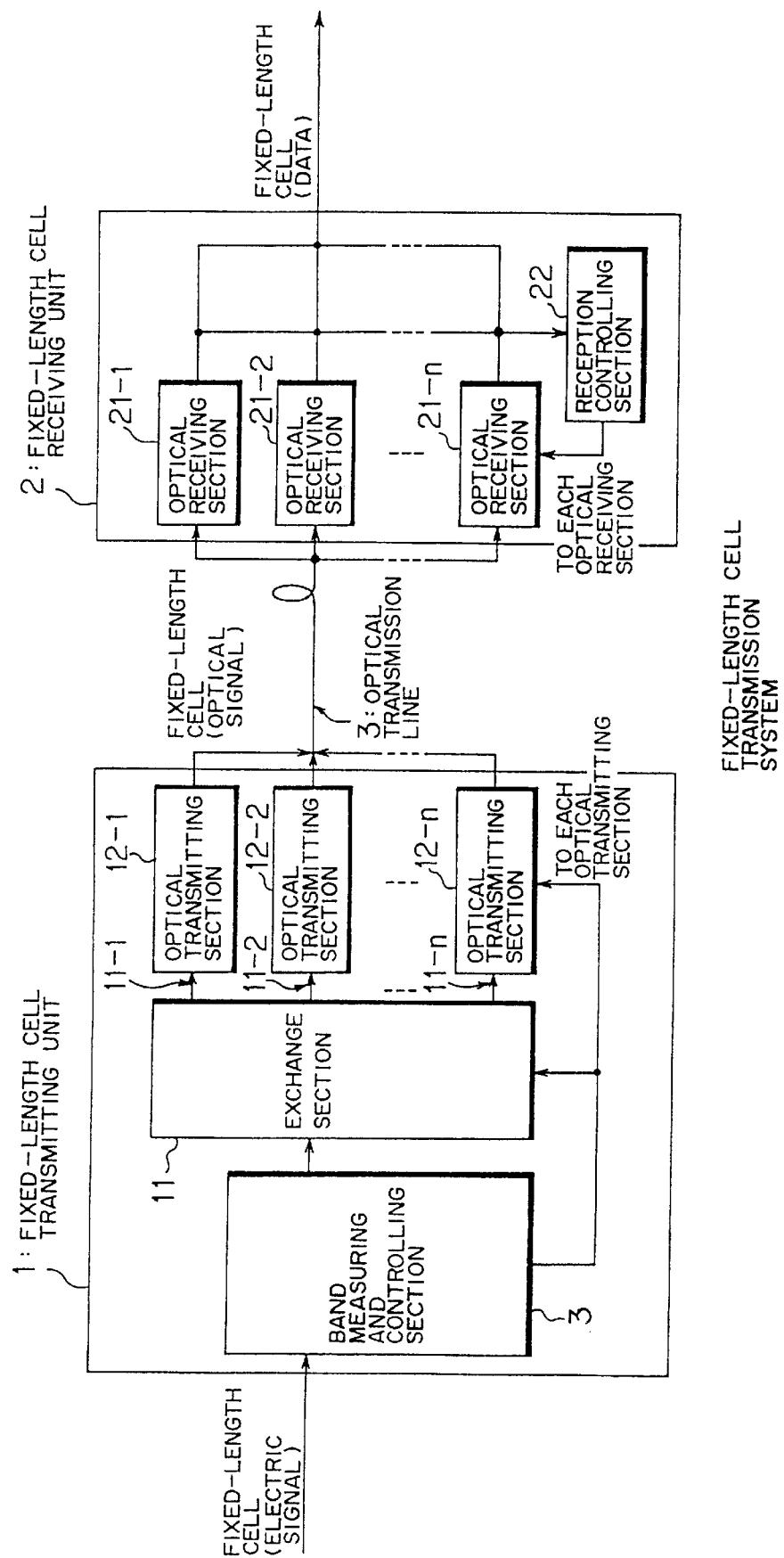
FIG. 1 is a block diagram showing an aspect of the present invention.

FIG. 1 is a block diagram showing an aspect of this invention, and in this illustration a fixed-length cell transmission system according to this invention is composed of a fixed-length cell transmitting unit 1 and a fixed-length cell receiving unit 2. The fixed-length cell transmitting unit 1 includes an exchange (or switching) section 11, a plurality of optical transmitting sections 12-1 to 12-n (where n denotes a natural number), and a band measuring and controlling section 13, whereas the fixed-length cell receiving unit 2 has a plurality of optical receiving sections 21-1 to 21-n and a reception controlling section 22. In the fixed-length cell transmitting unit 1, reference numerals 11-1 to 11-n depict exit ports of the exchange section 11.

In the fixed-length cell transmitting unit (which will be referred hereinafter to as a transmitting unit) 1, the exchange section 11 functions to receive a fixed-length cell in the form of an electric signal and further to output the fixed-length cell to any one of the plurality of exit ports 11-1 to 11-n, while each of the optical transmitting sections 12-i (where i=1 to n) coupled to the corresponding one of the exit ports 11-i of the exchange section 11 to convert the fixed-length cell of the electric signal into an optical signal and further to output the conversion result.

Furthermore, the band measuring and controlling section 13 serves to measure band information from the fixed-length cell of the electric signal inputted, to selectively determine one (or more) to be put to use from among optical transmitting sections 12-i on the basis of the measurement result, to place the optical transmitting section(s) 12-i to be used into operation, and to output the fixed-length cell inputted to the exchange section 11 to the exit port 11-i which is in connection with the optical transmitting section 12-i to be put to use.

On the other hand, in the fixed-length cell receiving unit (which will be referred hereinafter to as a receiving unit) 2, each of the optical receiving sections 21-i is connected through an optical transmission line 3 to the above-mentioned transmitting unit 1 to convert a fixed-length cell of an optical signal into an electric signal and to output the electric signal, while the reception controlling section 22 is for driving the optical receiving section 21-i corresponding to the optical transmitting section 12-i to be used in the transmitting unit 1.

In the fixed-length cell transmission system thus arranged according to this invention, in the transmitting unit 1, only the optical transmitting section 12-i needed for the data (fixed-length cell) transmission is driven based on the band information of the input fixed-length cell, and the data is given only to that optical transmitting section 12-i, and converted into an optical signal and then outputted to the receiving unit 2. On the other hand, in the receiving unit 2, the optical receiving section 21-i corresponding to the optical transmitting section 12-i under operation in the transmitting unit 1 is driven through the reception controlling section 22, so that the fixed-length cell of the optical signal received is converted into an electric signal.

That is, the above-mentioned fixed-length cell transmission system uses (drives) only the optical transmitting section 12-i and the optical receiving section 21-i needed for the data transmission on the basis of the band information of the input fixed-length cell, thus carrying out the data transmission with a high efficiency without the need for transmission of a vacant cell or the like. Accordingly, not only the power consumption of the whole system is remarkably reducible, but also the flexible transmission of the fixed-length cell is possible.

Thus, for instance, the transmitting unit 1 can be arranged to supply the receiving unit 2 with a control cell having information about the optical transmitting section 12-i to be put to use, with the result that through the detection of the control cell the receiving unit 2 can capture the optical receiving section 21-i corresponding to the aforesaid optical transmitting section 12-i to be driven so that the optical receiving section 21-i to be used can always surely be placed into operation, which contributes to higher reliability of this system.

In this case, if a dedicated control transmission line for the transmission of the aforesaid control cell is interposed between the transmitting unit 1 and the receiving unit 2, now that the control cell is transmitted to the receiving unit 2 side separately from the fixed-length cell, the receiving unit 2 can detect the control cell without the need for such special detection processing as to detect the control cell from a group of reception fixed-length cells. Therefore, the drive control of optical receiving section 21-i in the reception side becomes simple, thus further contributing to the reduction in power consumption and in size.

Incidentally, it is also appropriate that a buffer for accumulating the incoming fixed-length cells is provided on the input side of the exchange section 11 of the transmitting unit 1. This allows the transmitting unit 1 to accomplish the data transmission with no loss of fixed-length cells even if the data quantity of the input fixed-length cell or the operating band varies. Accordingly, the reliability of this system rises sharply at the transmission.

In addition, in this fixed-length cell transmission system, it is also appropriate that the transmitting unit 1 has an arrangement where the logical channel information of the fixed-length cell is altered before exchanging in the exchange section 11, while the receiving unit 2 assumes an arrangement in which the altered logical channel information is returned to the original logical channel information. With these arrangements, in the transmitting unit 1, due to the change of the logical channel information of the fixed-length cell, the fixed-length cell is outputted to the exit port 11-i of the exchange section 11 which is in connection with the optical transmitting section 12-i to be used (being in the driven condition). On the other hand, in the receiving unit 2, the logical channel information altered in the transmitting unit 1 is returned to the original logical channel information, and hence the operating logical channel between the transmitting unit 1 and the receiving unit 2 can freely be set independently in the transmission system. Accordingly, for example, the easy application to the existing transmission system is expectable.

Furthermore, it is also acceptable that in the transmitting unit 1 the optical transmitting section(s) 12-i among aforesaid plurality of optical transmitting sections 12-i which are not put to use is (are) made to serve as spare optical transmitting section(s) at the occurrence of troubles. In this case, even if in the transmitting unit 1 some trouble occurs to destroy the function of the optical transmitting section 12-i under use, in place of that optical transmitting section 12-i the foregoing spare optical transmitting section is driven, thereby assuring the continuation of the normal transmission operation of the fixed-length cell. Therefore, the reliability on use of this system increases.

Still further, it is also acceptable that the receiving unit 2 (reception controlling section 22) is designed to operate the corresponding optical receiving section 21-i on the basis of the information about the optical transmitting section 12-i to be used in the transmitting unit, which information is forwarded from the transmitting unit 1. In this case, the receiving unit 2 can operate the corresponding optical receiving section 21-i regardless of the aforesaid control cell so that the corresponding optical receiving section 21-i receives the fixed-length cell of the optical signal coming from the transmitting unit 1. This greatly contributes to the flexibility of the system arrangement.

More specifically, if the above-mentioned reception controlling section 22 is arranged to, for example, detect the control cell having the information about the optical transmitting section 12-i to be put to use in the transmitting unit 1, coming from the transmitting unit 1, to drive the corresponding optical receiving section 21-i, it is possible to certainly operate the optical receiving section 21-i forming a counterpart to the optical transmitting section 12-i and to make the optical receiving section 21-i take effects. According to this arrangement, with an extremely simple control operation it is possible to surely drive the optical receiving section 21-i to be put into action.

In FIG. 1, the optical transmission line 3 interposed between the transmitting unit 1 and the receiving unit 2 is constructed as an optical signal multiplexing transmission line to multiplex the optical signals from the respective optical transmitting sections 12-i, which can promote the effective utilization of the band on one optical transmission line. Accordingly, the transmission of the fixed-length cell is more effectively possible, and even the cost reduction of the optical transmission line is considerably feasible.

On the contrary, this optical transmission line 3 can also be constructed as a spatial multiplexing transmission line comprising a plurality of optical transmission lines each of which can transmit an optical signal from each of the optical transmitting sections 12-i. In this case, the optical transmitting section 12-i and the optical receiving section 21-i are coupled in one-to-one relation, with the result that, for example, it is possible to flexibly deal with the expansion of the optical transmitting section 12-i and the optical receiving section 21-i. Further, flexibility in the arrangement of this system is insurable.

The above-mentioned band measuring and controlling section 13 is, for instance, composed of parts mentioned in the following items (1) and (2):

(1) a band information measuring section for measuring band information from a fixed-length cell inputted as an electric signal; and (2) a transmission controlling section for selectively determining an optical transmitting section(s) 12-i, put to use, from among optical transmitting sections 12-i on the basis of band information measured in the aforesaid band information measuring section, for outputting a drive control signal, whereby the optical transmitting section 12-i to be used is driven, to the corresponding optical transmitting section 12-i, and for forwarding to the exchange section 11 a routing control signal which causes a fixed-length cell inputted to the exchange section 11 to be outputted to an exit port 11-i being in connecting relation to the optical transmitting section 12-i to be used.

With this arrangement, the band measuring and controlling section 13 drives the necessary optical transmitting section 12-i in accordance with the aforesaid drive control signal and carries out the supply of a fixed-length cell from the exchange section 11 to that optical transmitting section 12-i in accordance with the aforesaid routing control signal. That is why the fixed-length cell to be transmitted can surely be converted into an optical signal and outputted, besides this system further gains in reliability.

At this time, the foregoing band information measuring section can also be composed of a whole operating band information measuring section for measuring the whole operating band information from the fixed-length cell of an electric signal inputted and a logical channel operating band information measuring section for measuring the operating band information at every logical channel the fixed-length cell uses. In this case, in the band information measuring section the whole operating band information and the operating band information at every logical channel are certainly obtainable as the information necessary for determining the optical transmitting section 12-i to be put to use. Thus, with an extremely simple operation, the calculation and determination of the number of optical transmitting sections for the necessary band becomes possible, and the determination of the optical transmitting sections 12-i to be used is always feasible at a high speed, thereby perceptibly enhancing the processing ability of this system.

Moreover, it is also appropriate that the aforesaid whole operating band information measuring section includes a counter for counting the fixed-length cells, while the logical channel operating band information measuring section includes a logical channel information detecting section for detecting the logical channel information and a plurality of counters for counting the fixed-length cells having the same logical channel information on the basis of the logical channel information detected in the logical channel information detecting section.

In this case, in the whole operating band information measuring section, the counted value of the counter serves as the whole operating band information, whereas in the logical channel operating band information measuring section, each of the counted values of the respective counters works as the operating band information at every logical channel, and hence the functions of the respective sections are realizable with extremely easy and simple arrangements.

On the other hand, the foregoing transmission controlling section is composed, for example, of parts mentioned in the following items (1) to (4):

(1) a use number determining section for determining the optical transmitting section(s) 12-i to be used from among the optical transmitting sections 12-i on the basis of the measurement result by the aforesaid whole operating band information measuring section;

(2) a storage section for storing the operating band information corresponding to a logical channel at every optical transmitting section to be used on the basis of the measurement result in the aforesaid logical channel operating band information measuring section;

(3) a drive control signal outputting section for reading out the stored information from the storage section to output the aforesaid drive control signal; and (4) a routing control signal outputting section for reading out the stored information from the storage section to output the aforesaid routing control signal.

With this arrangement, in this transmission controlling section the operating band information corresponding to the logical channel in the storage section is successively updated, so that only the optical transmitting section(s) 12-i needed is always driven and the fixed-length cell is given thereto. Accordingly, the simplification of this system and the speed-up of control are surely achievable.

At this time, the above-mentioned transmission controlling section can also output a non-driving control signal to the optical transmitting section(s) 12-i, free from operation, of the respective optical transmitting sections 12-i. In this case, only the optical transmitting section(s) 12-i needed can more surely be driven, which greatly contributes to higher reliability of this system.

Furthermore, although the FIG. 1 fixed-length cell transmission system comprises both the transmitting unit 1 and receiving unit 2, it can employ only one of them to organize a transmission-dedicated system or a reception-dedicated system. This can enlarge the application range of this system to a transmission system and, hence, greatly contributes to the flexibility on the system construction.

(b) Description of First Embodiment of this Invention

Secondly, a description will be made hereinbelow of a first embodiment of the present invention with reference to the drawings.

(b-1) Description of First Embodiment

Figure 2:
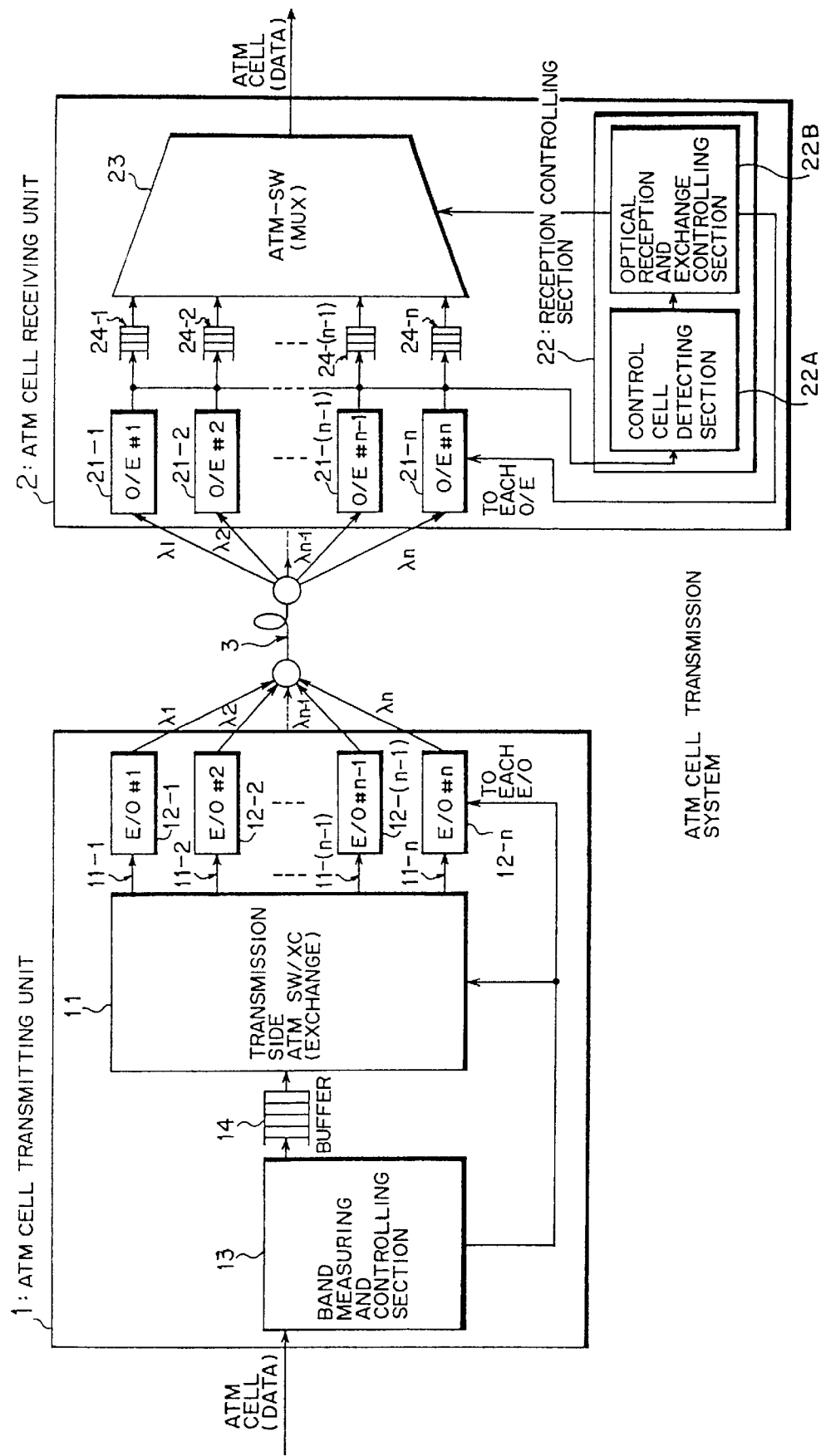
FIG. 2 is a block diagram showing an arrangement of an ATM cell transmission system according to a first embodiment of this invention.

FIG. 2 is a block diagram showing an arrangement of an ATM cell transmission system according to a first embodiment of this invention. As shown in FIG. 2, the ATM cell (fixed-length cell) transmission system according to this embodiment is made up of an ATM cell transmitting unit 1, an ATM cell receiving unit 2, and an optical transmission line 3 being an optical fiber interposed between both the units 1, 2.

In addition, as shown in FIG. 2, the ATM cell transmitting unit 1 is composed of a transmission side ATM switch/cross connect (SW/XC) section 11, a plurality of electric/optic conversion sections (which will be referred hereinafter to as E/O conversion sections) 12-1 to 12-n (#1 to #n), a band measuring and controlling section 13, and a buffer 14, whereas the ATM cell receiving unit 2 is made up of a plurality of optic/electric conversion sections (which will be referred hereinafter to as O/E conversion sections) 21-p (O/E #p) respectively corresponding to the E/O conversion sections 12-p (where p=1 to n), a reception controlling section 22, a reception side ATM switch (MUX) 23, and a plurality of buffers 24-p respectively corresponding to the O/E conversion sections 21-p. In the illustration, reference marks 11-p signify exit ports of the transmission side ATM SW/XC section 11.

First, in the ATM cell transmitting unit (which may also be referred hereinafter to as a transmitting unit) 1, the transmission side ATM SW/XC section (exchange section) 11 is designed to accept as a metallic signal (electric signal) an ATM cell outputted from an ATM exchange (not shown) or the like and to output the ATM cell to any one of the exit ports 11-p, and each of the E/O conversion sections (optical transmitting sections) 12-p is coupled to the exit ports 11-p of the transmission side ATM SW/XC section 11 to convert the ATM cell of the metallic signal into an optical signal having a given band (frequency) $\lambda p$ and to output the optical signal.

Furthermore, the band measuring and controlling section 13 measures band information from the ATM cell of the metallic signal inputted, and selectively determines the E/O conversion section(s) 12-p to be put to use from among the E/O conversion sections 12-p on the basis of the measurement result to place the determined E/O conversion section (s) 12-p to be used into operation, and further outputs the ATM cell inputted to the transmission side ATM SW/XC section 11 to the exit port 11-p which is in connection with the E/O conversion section(s) 12-p to be used.

The buffer 14 accumulates the incoming ATM cells, and as shown in FIG. 2, is provided on the input side of the transmission side ATM SW/XC section (exchange section) 11, and hence, even if the inputted ATM cell data amount rapidly increases, the data transmission is possible with no loss of the ATM cells.

On the other hand, in the ATM cell receiving unit (which may also be referred hereinafter to as a receiving unit) 2, each of the O/E conversion sections (optical receiving sections) 21-p is connected through the optical transmission line 3 to the above-mentioned transmitting unit 1 (the corresponding E/O conversion section 12-p) to convert the ATM cell of the optical signal into a metallic signal and to output the converted signal. The reception controlling section 22 drives the O/E conversion section(s) 21-p corresponding to the E/O conversion section(s) 12-p to be used (under operation) in the transmitting unit 1. The arrangement of the reception controlling section 22 will be left to the later description.

Still further, the reception side ATM switch 23 selectively outputs the ATM cell of the metallic signal from each of the O/E conversion sections 21-p in accordance with a control signal from the reception controlling section 22 to multiplex and output the ATM cells in a time-division way, while as well as that of the transmitting unit 1 the respective buffers 24-p are made to once store the incoming ATM cells, and accomplishes the transmission with no loss of the ATM cells even if the inputted (received) ATM cell data amount rapidly increases.

In the ATM cell transmission system thus arranged according to this embodiment, in the transmitting unit 1, the E/O conversion section(s) 12-p necessary for the data (ATM cell) transmission is (are) driven by the band measuring and controlling section 13 on the basis of the band information of the inputted ATM cell, and that E/O conversion section 12-p outputs the ATM cell of the optical signal. On the other hand, in the receiving unit 2 the O/E conversion section(s) 21-p corresponding to the driven E/O conversion section(s) 12-p in the transmitting unit 1 is placed into operation through the reception controlling section 22.

A brief description of the above-mentioned ATM cell transmission system is to say that only the E/O conversion section(s) 12-p and the O/E conversion section(s) 21-p needed for the data transmission on the basis of the band information of the inputted ATM cell are used (driven) so that the data transmission is made with a high efficiency without the transmission of a vacant cell or the like.

Figure 3:
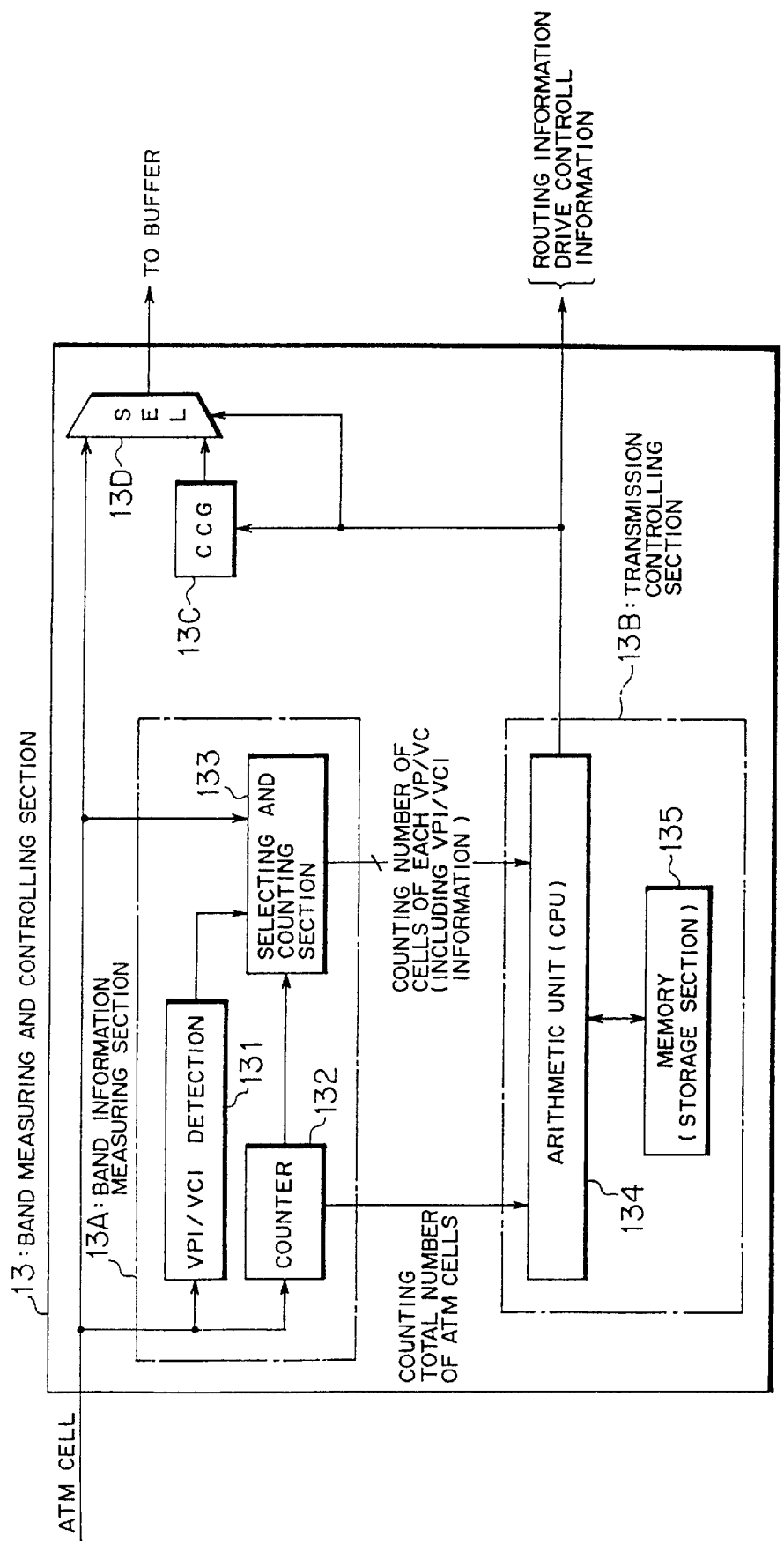
FIG. 3 is a block diagram showing an arrangement of a band measuring and controlling section in the ATM cell transmission system according to the first embodiment.

Thus, for instance as shown in FIG. 3 the aforesaid band measuring and controlling section 13 is composed of a band information measuring section 13A, a transmission controlling section 13B, a control cell generator (CCG) 13C, and a selector (SEL) 13D.

The band information measuring section 13A is for measuring the band information from an ATM cell of a metallic signal inputted, and in this embodiment, as shown in FIG. 3 it includes a VPI/VCI detecting section 131, a counter 132, and a selecting and counting section 133, wherein the counter (whole operating band information measuring section) 132 measures the operating band information of the whole ATM cell by counting the total number of inputted ATM cells per unit time.

Furthermore, the VPI/VCI detecting section 131 and the selecting and counting section 133 function as a logical channel operating band information measuring section which measures the operating band information at every VPI/VCI the ATM cell uses, and the VPI/VCI detecting section (logical channel information detecting section) 131 is designed to detect the VPI/VCI (logical channel information) from the inputted ATM cell, while the selecting and counting section 133 is made to measure the operating band information at every VPI/VCI in a manner of counting the number of ATM cells having the same VPI/VCI on the basis of the VPI/VCI the VPI/VCI detecting section 131 detects.

Figure 4:
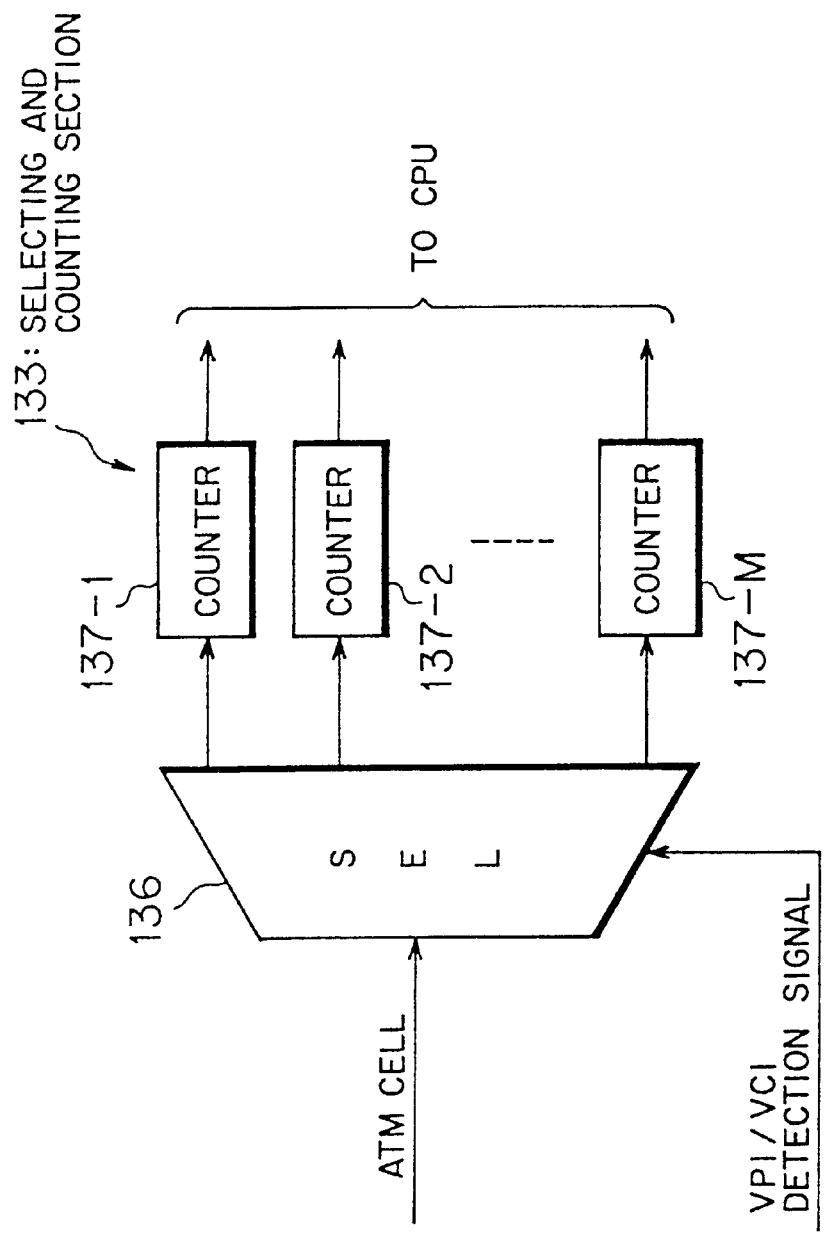
FIG. 4 is a block diagram showing an arrangement of a selecting and counting section in the ATM cell transmission system according to the first embodiment.

For this reason, for example as shown in FIG. 4, concretely the selecting and counting section 133 is composed of a selector 136 and a plurality of counters 137-1 to 137-M (where M represents the total number of kinds of the VPI/VCI values which can exist in the form of a natural number), and the output of the selector 136 is switched in accordance with the VPI/VCI value (VPI/VCI detection signal) detected in the aforesaid VPI/VCI detecting section 131 so that the counter 137-J (where J=1 to M) corresponding to each of the VPI/VCI values counts the ATM cells having the same VPI/VCI value.

Moreover, the transmission controlling section 13B selectively determines the E/O conversion section(s) 12-p to be put to use, from among the E/O conversion sections 12-p on the basis of the band information measured by the aforesaid band information measuring section 13A, supplies the corresponding E/O conversion section(s) 12-p with drive control information (a drive control signal) to drive the E/O conversion section(s) 12-p to be used, and issues to the transmission side ATM SW/XC section 11 a routing control signal which causes the ATM cell inputted to the transmission side ATM SW/XC section 11 to be sent to the exit port 11-p coupled to the E/O conversion section(s) 12-p to be used.

For this purpose, the transmission controlling section 13B is, as shown in FIG. 3, composed of an arithmetic unit (CPU) 134 and a memory 135, and as will be described later with reference to FIGS. 6 and 7, the arithmetic unit 134 makes the memory 135 store the operating band and the VPI/VCI (both are fixed values) to be ensured for a control cell (described later) in addition to the measurement result by the band information measuring section 13A at every E/O conversion section 12-p. Moreover, the arithmetic unit 134 determines the E/O conversion section(s) 12-p to be put to use on the basis of the stored information, and conducts such information updating operations as to allocate the VPI/VCI and the operating band to the determined E/O conversion section(s) 12-p and subsequently reads out the stored information to output the aforesaid drive control signal and routing control signal.

Accordingly, the arithmetic unit 134 has the following functional portions:

(1) a functional portion working as a using number determining section for determining the E/O conversion section(s) 12-p to be used from among the E/O conversion sections 12-p on the basis of the measurement result (count value) by the counter 132;

(2) a functional portion serving as a drive control signal outputting section for reading out the stored information from the memory 135 to issue a drive control signal; and (3) a functional portion acting as a routing control signal outputting section for reading out the stored information from the memory 135 to issue a routing control signal.

The memory (storage section) 135 is designed to store the operating band information corresponding to VP/VC at every E/O conversion section(s) 12-p to be used, on the basis of the measurement result (count value) by the selecting and counting section 133 and the VPI/VCI detecting section 131. This memory 135 can be incorporated into the arithmetic unit 134.

Furthermore, in FIG. 3, the control cell generator 13C produces a control cell by adding tag information (routing information: the VPI/VCI and the operating band ensured for the control cell) from the transmission controlling section 13B to information about the E/O conversion section(s) 12-p (for example, section numbers #1 to #n) determined as the E/O conversion section(s) 12-p to be put to use, and the selector 13D selectively outputs the inputted ATM cell and the control cell produced in the control cell generator 13C in a manner that its output is switched in accordance with the routing information from the transmission controlling section 13B.

That is, the transmitting unit 1 according to this embodiment is made to transmit the control cell having the information on the E/O conversion section(s) 12-p to be put to use toward the receiving unit 2.

Figure 5:
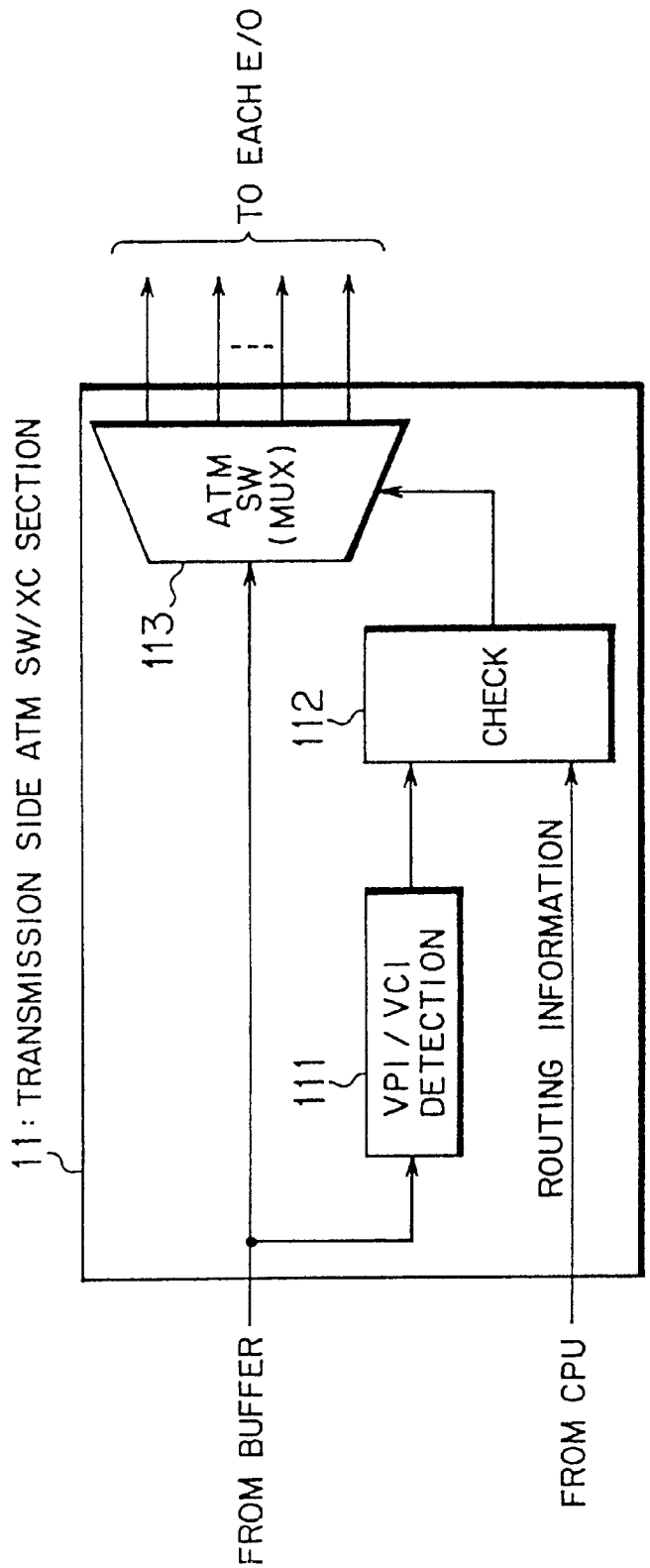
FIG. 5 is a block diagram showing an arrangement of a transmission side ATM SW/XC section in the ATM cell transmission system according to the first embodiment.

FIG. 5 is a block diagram showing an arrangement of the above-mentioned transmission side ATM SW/XC section 11. As shown in FIG. 5, the transmission side ATM SW/XC section 11 according to this embodiment is provided with a VPI/VCI detecting section 111, a checking section 112, and a transmission side ATM switch (ATMSW: MUX) 113.

The VPI/VCI detecting section 111 is made to detect the VPI/VCI from the tag information of the inputted ATM cell as well as that of the foregoing band information measuring section 13A (see FIG. 3), while the checking section 112 checks the VPI/VCI detected by the VPI/VCI detecting section 111 with the routing information supplied from the aforesaid arithmetic unit 134, and switches the ATM switch 113, realized with a matrix switch or the like, in accordance with the checking result to output the ATM cell (including the control cell) to a given exit port 11-p for the supply to the E/O conversion section 12-p to be put to use.

Moreover, in the receiving unit 2, as shown in FIG. 2, the aforesaid reception controlling section 22 comprises a control cell detecting section 22A and an optical reception and exchange controlling section 22B, with the control cell detecting section 22A being made to detect a control cell coming from the transmitting unit 1 as described before on the basis of the output of each of the O/E conversion sections 21-p and with the optical reception exchange controlling section 22B being designed to control the drive of the O/E conversion section 21-p and the change-over of the reception side ATM switch 113 in accordance with the detection result in the control cell detecting section 22A.

Figure 6:
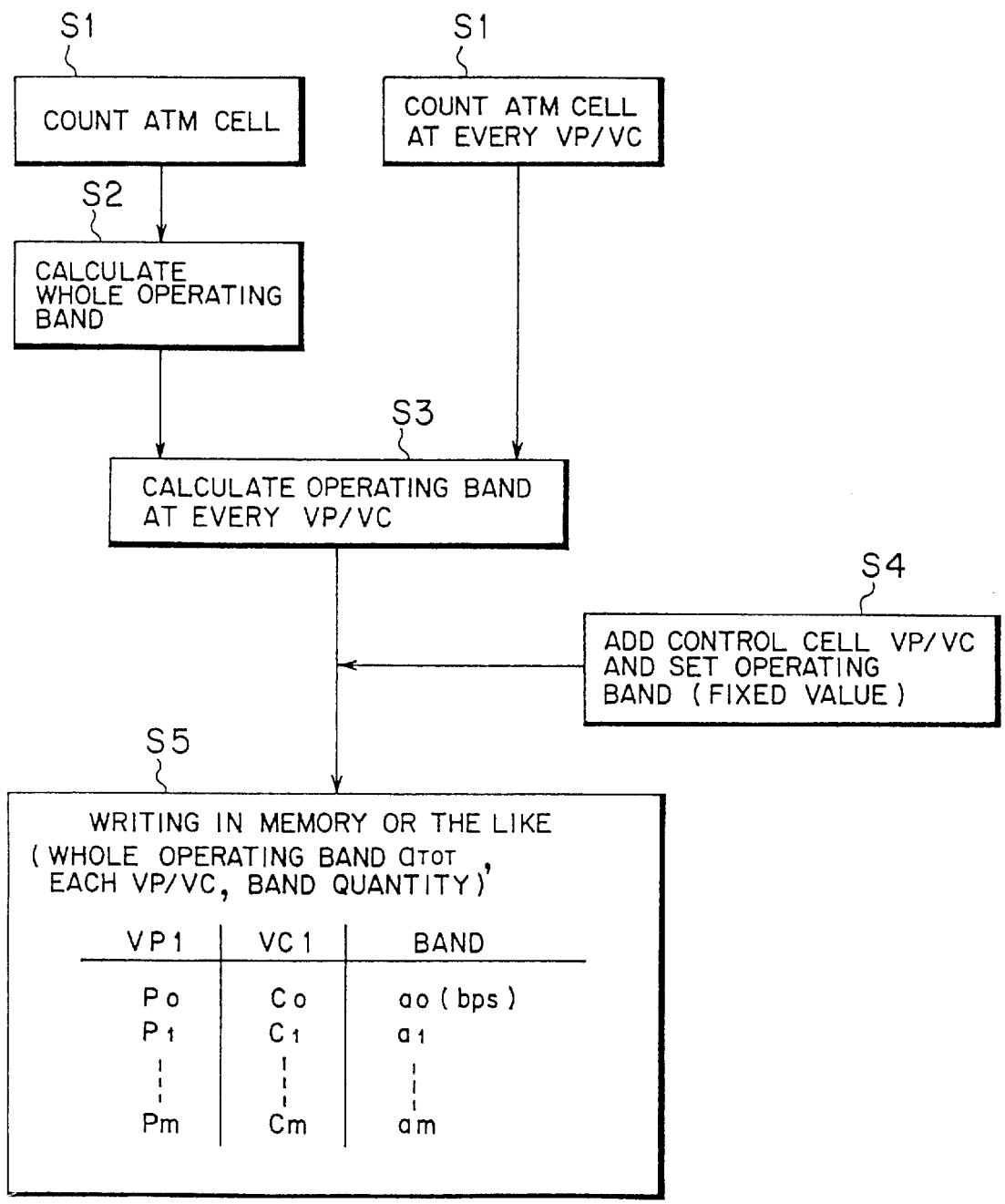
FIGS. 6 and 7 are illustrations useful for explaining an operation of the ATM cell transmission system according to the first embodiment.
Figure 7:
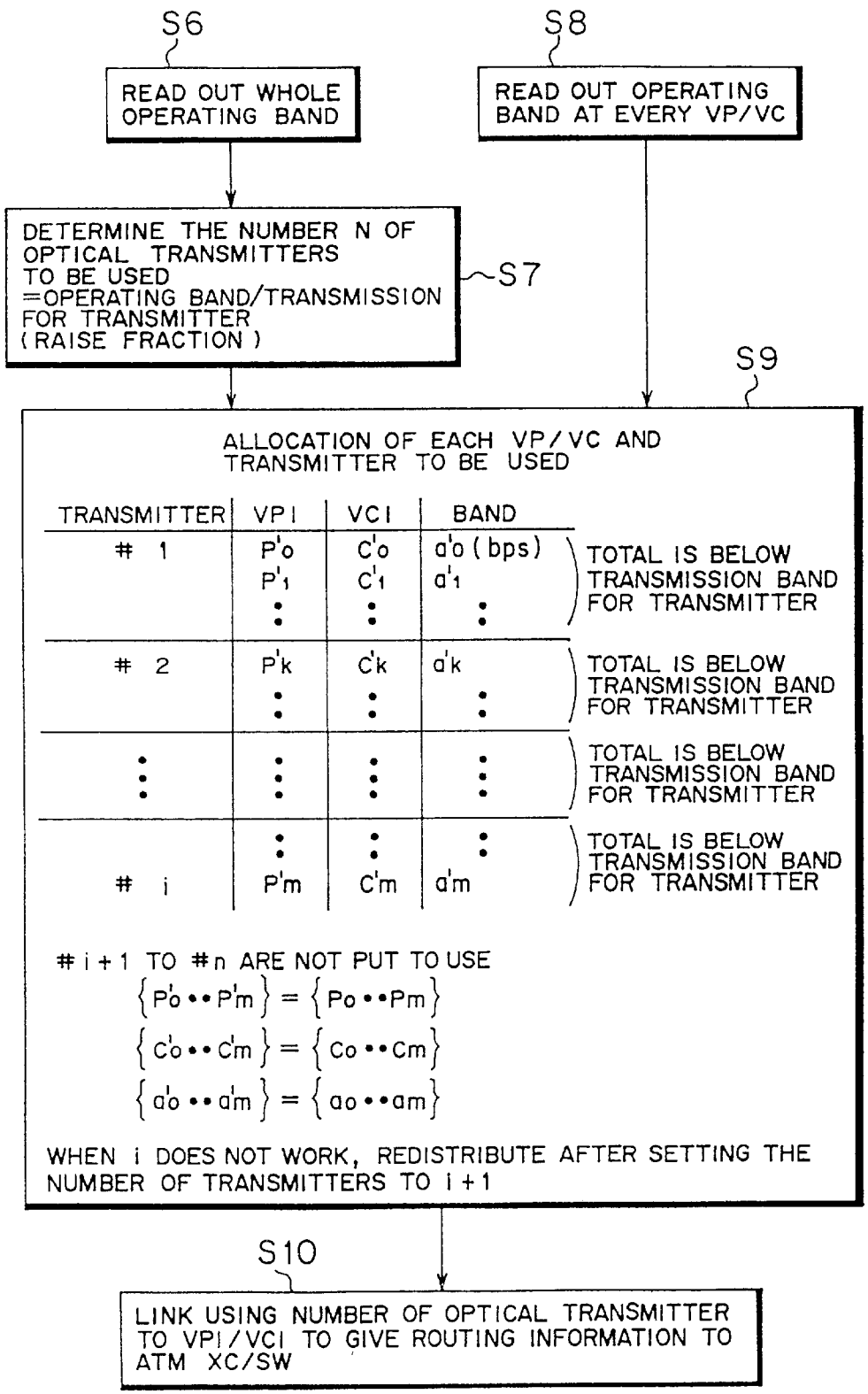

Referring to FIGS. 6 and 7, a detailed description will be made hereinbelow of an operation (operational algorithm) of the ATM cell transmission system thus arranged according to this embodiment.

First of all, in terms of an ATM cell inputted to this ATM cell transmission system, the band information measuring section 13A and the transmission controlling section 13B of the band measuring and controlling section 13 measure its VP/VC band up to the VC level. More specifically, at this time, in the band information measuring section 13A, as shown in FIG. 6 first the counter 132 counts the total number of inputted ATM cells per unit time and the VPI/VCI detecting section 131 checks the VP/VC of the inputted ATM cell (the detection of VPI/VCI) while the selecting and counting section 133 counts the number of ATM cell having the same VPI/VCI to obtain the number of ATM cells at every VPI/VCI (step S1).

In more detail, in the selecting and counting section 133, owing to the output of the selector 136 (see FIG. 4) being switched in accordance with the VPI/VCI detection signal from the VPI/VCI detecting section 131, each counter 137-J counts the ATM cells having the VPI/VCI it takes charge of. Further, the band information measuring section 13A hands over the obtained count value to the arithmetic unit 134 of the transmission controlling section 13B (step S2). On the reception, the arithmetic unit 134 first measures (calculates) the operating band (the whole operating band) due to all the ATM cells on the basis of the count value (the total number of ATM cells) attained through the counter 132 (step S2).

In brief, the ATM cell transmission system (transmitting unit 1) according to this embodiment finds the aforesaid whole operating band information and operating band information at every VP/VC through the use of the count values of the counters 132, 137-J, so that the above-mentioned functions are achievable with an extremely easy and simple arrangement.

Moreover, the arithmetic unit 134 measures the operating band allocated to each VP/VC on the basis of the obtained whole operating band information and the number of ATM cells at every VPI/VCI from the selecting and counting section 133 (step S3) and makes the memory 135 store the respective measurement results (the whole operating band, VPI/VCI, operating band allocated to each VP/VC) (step S5).

On the other hand, at this time the arithmetic unit 134 also makes the memory 135 store, in addition to the aforesaid measurement results, the operating band and the VPI/VCI for the control cell (cell including information as to which E/O conversion section 12-p accepts the distribution of each VP/VC) (step S4). These operating band and VPI/VCI for the control cell are set in advance.

Thereafter, the arithmetic unit 134 reads out the stored information (the whole operating band, VPI/VCI, operating band allocated to each VP/VC) from the memory 135 to determine the E/O conversion section(s) 12-p to be put to use (which will sometimes be referred hereinafter to as a optical transmission section, an optical transmitter or an optical transmitting module) and the allocation of VP/VC to that optical transmitting section 12-p (the distribution of the operating paths to the optical transmitting sections 12-p) on the basis of the readout information. Besides, the arithmetic unit 134 gives the setting to the optical transmitting section (s) 12-p to be used through the use of drive control information and gives the setting to the transmission side ATM SW/XC section 11 through the use of routing information.

More specifically, at this time the arithmetic unit 134 performs the distribution of the respective VP/VC operating paths in accordance with, for example, the procedure as shown in FIG. 7.

That is, first, the arithmetic unit 134 reads out the whole operating band information from the memory 135 (step S6) and calculates, on the basis of the readout information (the status of the whole using band), the number N (where N is a natural number) of optical transmitting modules 12-p to be used through the operation according to the following equation (1) to determine the minimum necessary number N of optical transmitting modules to be placed into action. However, in the case of the operation according to the following equation (1), the fractions following a decimal point (base point) are raised (step S7).

the number N of optical transmitters 12-p to be used=whole operating band (bps)/transmission band (transmission rate) (bps) per one optical transmitter 12-p     (1)

That is, for the determination of the optical transmitting module(s) 12-p to be used, the above-mentioned transmission system (transmitting unit 1) takes the whole operating band information and the operating band information at every VP/VC as the necessary information to calculate and determine the number N of optical transmitting modules 12-p for the necessary band through an extremely simple calculation as expressed by the above-mentioned equation (1). Accordingly, it is possible to always determine the optical transmitting module(s) 12-p to be used at a high speed, which sharply improves the processing ability of this system.

Moreover, the arithmetic unit 134 reads out the operating band information at each VPI/VCI from the memory (step S8) and, on the basis of the readout information and the number N obtained through the above-mentioned operation, makes a determination as to which optical transmitting module 12-p receives the output (allocation) of each VP/VC (at this time, the VC band is immune to division) (step S9).

However, taking into consideration the transmission rate of each optical transmitting section 12-p and the operating band of each VP/VC, this determination is made so that the whole operating band does not exceed the transmission band (=the transmission rate of each optical transmitting module 12-p×the number N of optical transmitting modules 12-p to be used) which can be presented by the N optical transmitting modules 12-p.

For instance, assuming that the operating band for {VPI, VCI}={Pj, Cj} (j=1 to m) is taken to be "aj" (bps) and the maximum transmission rate of each optical transmitting module 12-i is taken as "b" (b>aj) and the number N of optical transmitting modules is determined to assume i (using the optical transmitting modules 12-1 to 12-i), each VP/VC is distributed to each of the optical transmitting modules 12-1 to 12-i so that the whole operating band "aj" does not come to be lacking in terms of all the optical transmitting modules 12-1 to 12-i and the sum total of operating bands "aj" allocated to each of the optical transmitting modules 12-1 to 12-i does not exceed the maximum transmission rate "b".

However, in the above-mentioned operation, if one of optical transmitting modules 12-1 to 12-i develops that the sum total of the operating bands "aj" allocated exceeds the maximum transmission rate "b", the reallocation is made in a manner that the number N is incremented by 1 (N=i+1). Between the band measuring and controlling section 13 and the transmission side ATM SW/XC section 11, as shown in FIG. 3, there is interposed the buffer 3, which allows the above-mentioned band reallocation with no delay irrespective of the change of the operating band.

Still further, the arithmetic unit 134 derives, as the routing information, VP/VC ({VPI, VCI}={Pj, Cj}) equivalent to the aforesaid operating band "aj" and conducts the setting to the transmission side ATM SW/XC section 11 (see FIGS. 2 and 5) (step S10). In addition, the drive control information is given to the optical transmitting modules 12-1 to 12-i to be used which in turn, come into driven conditions.

That is, in the above-described transmitting unit 1, the operating band information corresponding to the VP/VC is put in the memory at every optical transmitting modules 12-1 to 12-i, and the stored information is read out while being successively updated, so that the drive control information and the routing information are obtainable. That is why, with an extremely simple arrangement, only the optical transmitting modules 12-1 to 12-i needed are always driven and the data (ATM cells) are given thereto, thus accomplishing the simplicity of this system and the acceleration in control.

When a signal indicative of no employment (non-driving control signal) is given to the optical transmitting modules 12-(i+1) to 12-n free from use to stop the drive of the optical transmitting modules 12-(i+1) to 12-n, with the result that only the optical transmitting modules 12-1 to 12-i can be put to operation, which greatly contributes to higher reliability of this transmission system.

Furthermore, in the transmission side ATM SW/XC section 11, the transmission side ATM switch 113 is switched in accordance with the routing information obtained through the above-mentioned operation, and hence the inputted ATM cell (metallic signal) is distributed to the exit ports 11-1 to 11-i coupled to the optical transmitting modules 12-1 to 12-i to be used. Further, the optical transmitting modules 12-1 to 12-i make conversion of the ATM cell of the metallic signal into an optical signal (having wavelengths of $\lambda i$), before sending through the optical transmission line 3 to the receiving unit 2 side.

That is, the optical transmitting modules 12-1 to 12-i to be used are driven in response to the reception of the drive control signal from the arithmetic unit 134 and receive the supply of the ATM cell from the exit ports 11-1 to 11-i being in coupled relation thereto. Accordingly, the ATM cell to be transmitted is certainly converted into an optical signal and outputted, thus enhancing the reliability of this system.

At this time, through an optical path (VP/VC) to be used (in other words, by the control cell), the operating status of the optical transmitting modules 12-1 to 12-i under use (that is, the modules 12-1 to 12-i under operation and the VP/VC the modules 12-1 to 12-i assume) is communicated to the receiving unit 2. At this time, no trouble occurs, for that the band for this control cell is included as one of the operating band "aj" in the arithmetic unit 134 beforehand.

On the other hand, in the receiving unit 2, the reception controlling section 22 receives the information (control cell) about the operating status of the optical transmitting module 12-p to set, on the basis of the information, the O/E conversion section (which will sometimes be referred hereinafter to as an optical receiving section or an optical receiving module) 21-p and the reception side ATM switch 23.

In more detail, in the reception controlling section 22, the control cell detecting section 22A detects the control cell from the transmitting unit 1 and drives the optical receiving modules 21-1 to 21-i corresponding to the optical transmitting modules 12-1 to 12-i under operation in accordance with the information the same control cell has (stops the optical receiving modules scheduled so as not to be put to use), and further sets the reception side ATM switch 23. In this embodiment, taking this setting time into consideration, as in the case of the input side of the transmission side ATM SW/XC section 11, the buffers 24-p are provided at the preceding stage of the reception side ATM switch 23.

With this structure, the ATM cell subjected to the optic/electric conversion in each of the optical receiving modules 21-1 to 21-i is returned to the original condition (serial condition) and outputted, as well as the input side of the transmitting unit 1. At this time, since the VP/VC information is transmitted from the transmitting unit 1 with no conversion, in the receiving unit 2 the ATM cell can be returned to the original condition without altering the header (VP/VC) of the inputted ATM cell, besides the consideration on the cell order is unnecessary because the transmission is made in units of VC.

As described above, in the ATM transmission system according to this embodiment, the transmitting unit 1 drives only the optical transmitting section(s) 12-p needed for the data (ATM cell) transmission on the basis of the band information of the inputted ATM cell while the receiving unit 2 drives only the optical receiving section(s) 21-p corresponding to the optical transmitting section(s) 12-p driven in the transmitting unit 1, so that through the use of only the optical transmitting section(s) 12-p and optical receiving section(s) 21-p the data transmission is achievable with a high efficiency without the need for the transmission of a vacant cell or the like, with the result that not only the power consumption of the entire transmission system is sharply reducible but also the flexible ATM cell transmission is possible.

Furthermore, in the transmission system, the transmitting unit 1 transmits to the reception side the control cell having the information about the optical transmitting modules 12-1 to 12-i to be put to use, while the receiving unit 2 detects the control cell to find out the optical receiving modules 21-1 to 21-i to be driven. Thus, the receiving unit 2 can always certainly put the optical receiving sections 21-1 to 21-i to be used into operation, which greatly contributes to higher reliability of this system. Moreover, since being needed only to detect the control cell from the input data, through extremely simple control, the receiving unit 2 can surely place the optical receiving modules 21-1 to 21-i to be used into operation and effect.

Still further, in the above-described transmission system, since the buffer 14 for accumulating the incoming ATM cells is located on the input side of the transmission side ATM SW/XC section 11 of the transmitting unit 1, the transmitting unit 1 can accomplish the transmission with no loss of the ATM cells irrespective of variation of the inputted ATM cell data quantity and the operating band information. Therefore, this transmission system remarkably gains in reliability at transmission.

Moreover, in the above-described transmission system, the optical transmission line 3 put between the transmitting unit 1 and the receiving unit 2 is constructed as an optical signal multiplexing transmission line for multiplexing optical signals from the respective optical transmitting modules 12-p, and hence the effective utilization of the band on one optical transmission line 3 is feasible, which allows the ATM cell transmission with a higher efficiency and further which greatly contributes to the cost reduction of the optical transmission line 3.

Figure 8:
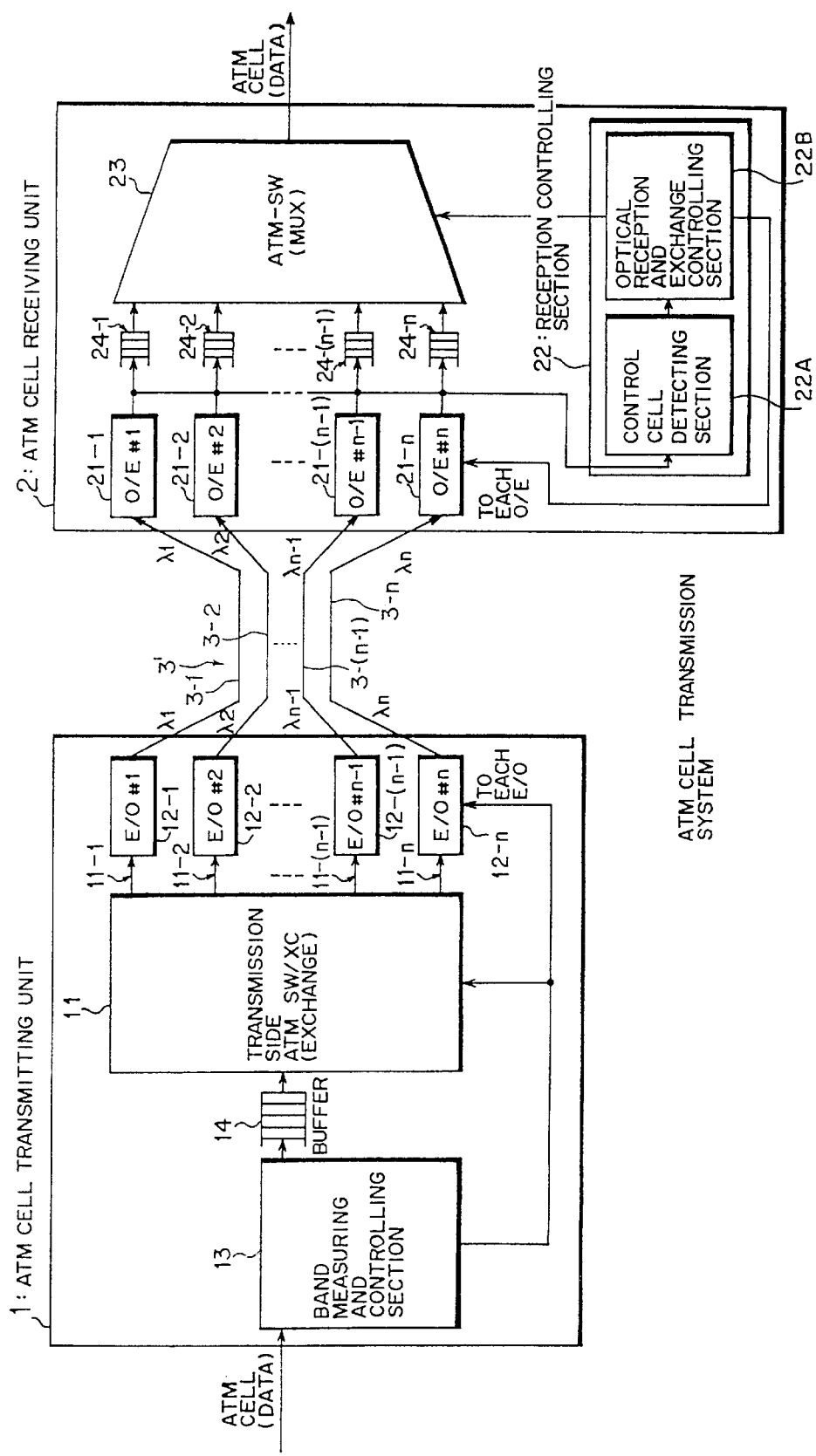
FIG. 8 is a block diagram showing a modification of the ATM cell transmission system according to the first embodiment.

For example, as shown in FIG. 8, the optical transmission line 3 can also be constructed as a spatial multiplexing transmission line 3' comprising a plurality of optical transmission lines (optical fibers) 3-p which are capable of respectively transmitting the optical signals from the respective optical transmitting sections 12-p in the parallel form. In this case, since the optical transmitting sections 12-p and the optical receiving sections 21-p get into one-to-one relation to each other, it becomes possible to flexibly cope with the expansion of the optical transmitting sections 12-p and the optical receiving sections 21-p, which contributes to further flexibility on the arrangement of this system.

(b-2) Description of Second Embodiment

Figure 9:
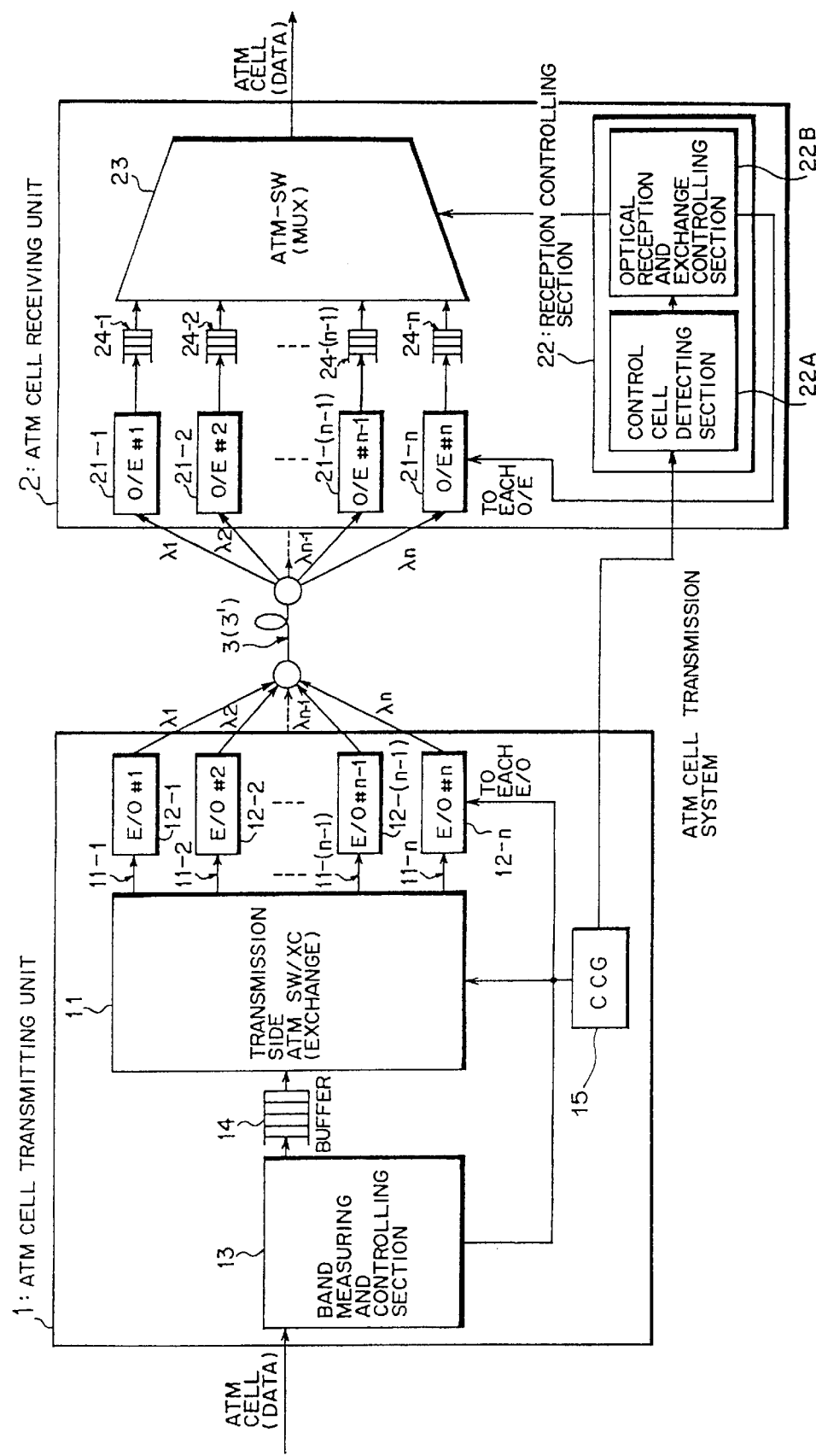
FIG. 9 is a block diagram showing an arrangement of an ATM cell transmission system according to a second embodiment of this invention.

FIG. 9 is a block diagram showing an arrangement of an ATM cell transmission system according to a second embodiment of the present invention. As shown in FIG. 9, the difference of the ATM cell transmission system according to this embodiment from the system according to the first embodiment (see FIG. 2) is that the transmitting unit 1 is equipped with a control cell generating section (CCG) 15 separately from a band measuring and controlling section 13 and further a controlling transmission line 4 made for only transmitting a control cell produced in the control cell generating section 15 is interposed between the transmitting unit 1 (control cell generating section 15) and the receiving unit 2 (control cell detecting section 22A).

Figure 10:
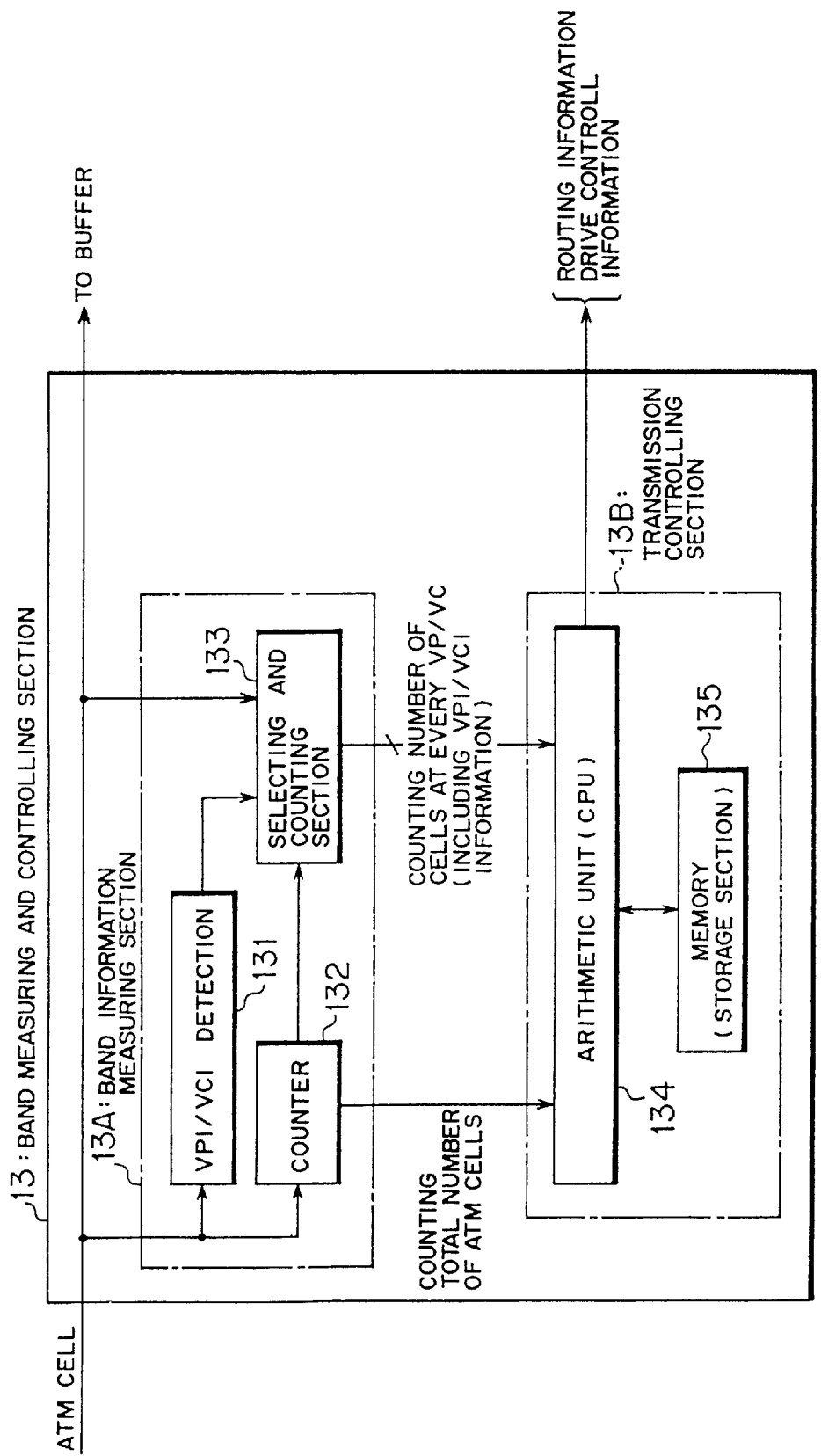
FIG. 10 is a block diagram showing an arrangement of a band measuring and controlling section in the ATM cell transmission system according to the second embodiment.

Thus, as shown in FIG. 10, the band measuring and controlling section 13 of the transmitting unit 1 is arranged to exclude the control cell generator 13C and the selector 13D from the arrangement in FIG. 3, with the inputted ATM cell being directly outputted to the buffer 14.

In the ATM cell transmission system according to this embodiment, with this arrangement, separately from the ATM cell, the control cell including the information about the optical transmitting section(s) 12-p to be put to use is sent through the controlling transmission line 4 to the receiving unit 2 and therefore, in the receiving unit 2, the control cell detecting section 22A can directly detect the control cell from the transmitting unit 1 without the need for such special processing as to detect the control cell from a group of received ATM cells.

Accordingly, in the receiving unit 2, the drive control for the optical receiving sections 21-p can be simplified, thus further accomplishing the reduction of the power consumption in this transmission system and the size reduction thereof.

Incidentally, even in this embodiment, the optical transmission line 3 can also be constructed as a spatial multiplexing transmission line 3' as mentioned with reference to FIG. 8.

(b-3) Description of Third Embodiment

Figure 11:
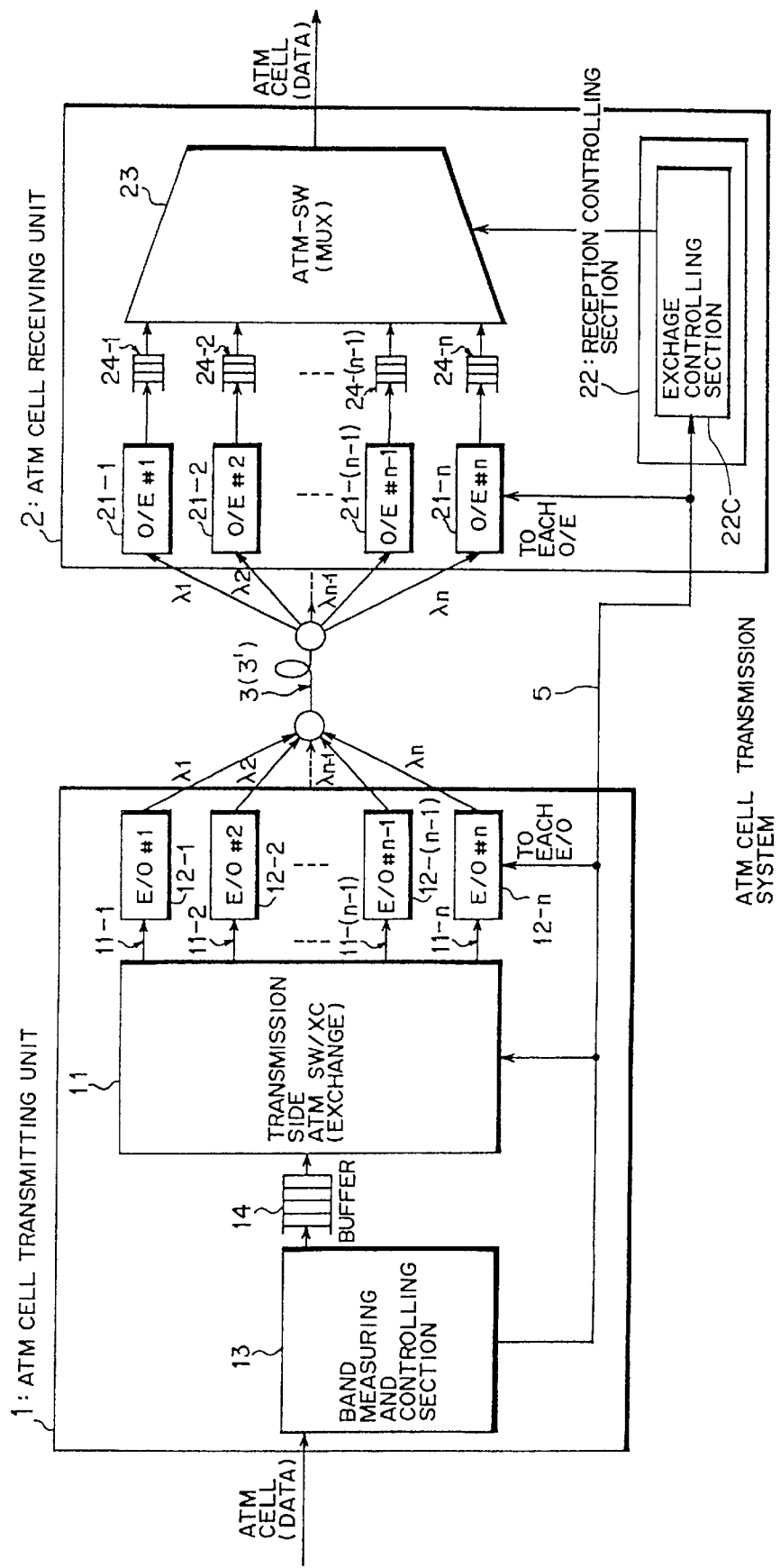
FIG. 11 is a block diagram showing an arrangement of an ATM cell transmission system according to a third embodiment of this invention.

FIG. 11 is a block diagram showing an arrangement of an ATM cell transmission system according to a third embodiment of the present invention. As shown in FIG. 11, the difference of the ATM cell transmission system according to this embodiment from the system according to the first embodiment (see FIG. 2) is that, in place of the control cell, the drive control information and the routing information obtained in the arithmetic unit 134 of the band measuring and controlling section 13 are directly supplied as a control signal through a control signal line 5 to the respective optical receiving sections 21-p and the reception controlling section 22.

Thus, the reception controlling section 22 according to this embodiment is arranged such that, as a substitute for the control cell detecting section 22A and the optical reception and exchange controlling section 22B in FIG. 2, there is provided an exchange controlling section 22C which directly receives the routing information from the transmitting unit 1 and controls the exchange processing depending upon the reception side ATM switch 23.

In the above-mentioned ATM cell transmission system, with this arrangement, without the detection of the control cell, the optical receiving section(s) 21-p corresponding to the optical transmitting section(s) 12-p is directly driven in response to the control signal from the transmitting unit 1, so that the corresponding optical receiving section 21-p receives the ATM cell from the transmitting unit 1. Accordingly, it is possible to greatly promote the size reduction of this transmission system and the flexibility on the system arrangement.

Incidentally, even in this embodiment, the optical transmission line 3 can also be constructed as a spatial multiplexing transmission line 3' as mentioned referring to FIG. 8.

(b-4) Description of Fourth Embodiment

Figure 12:
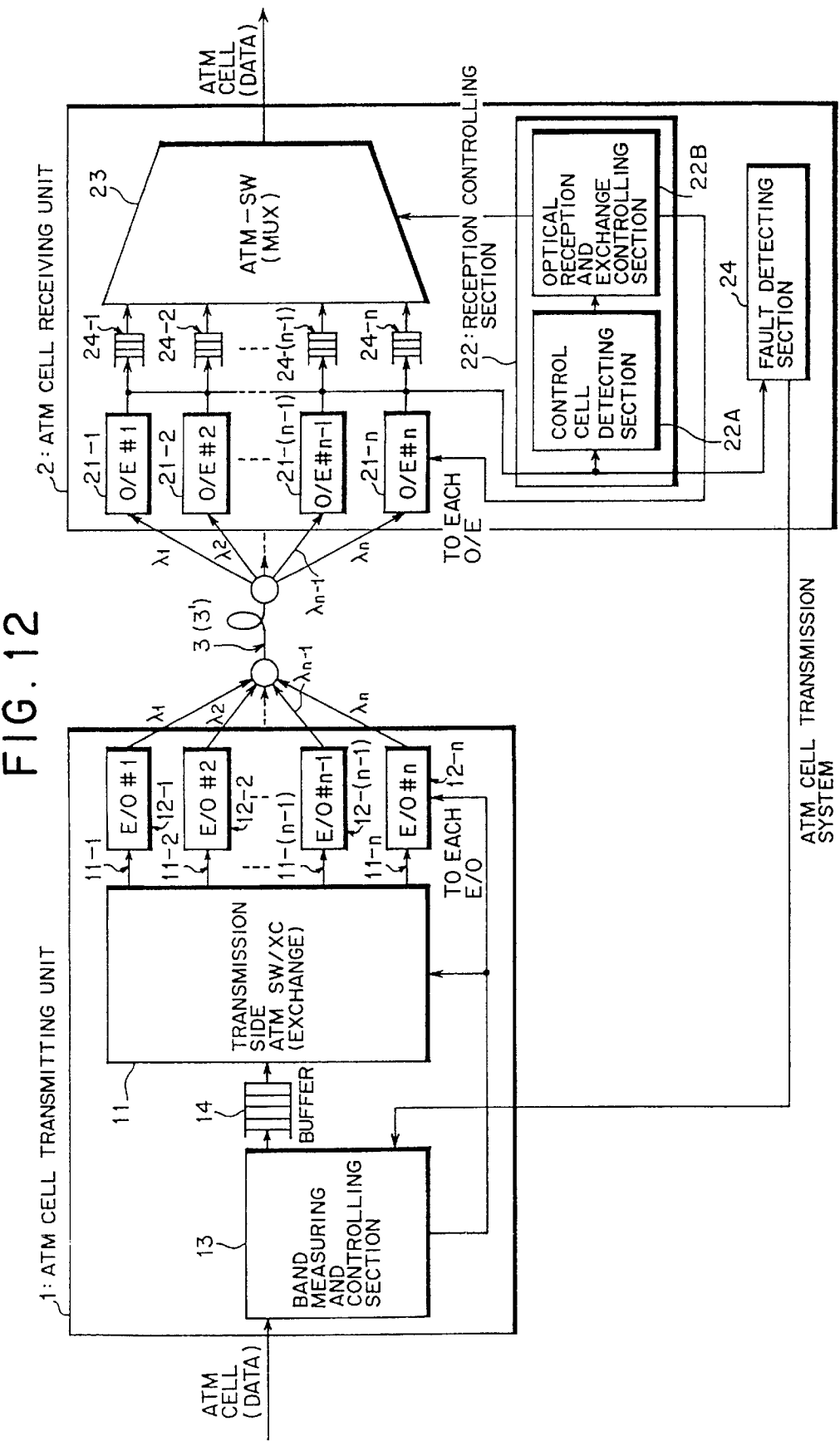
FIG. 12 is a block diagram showing an arrangement of an ATM cell transmission system according to a fourth embodiment of this invention.

FIG. 12 is a block diagram showing an arrangement of an ATM cell transmission system according to a fourth embodiment of the present invention. As shown in FIG. 12 the difference of the ATM cell transmission system according to this embodiment from the system according to the first embodiment (see FIG. 2) is that the receiving unit 2 is additionally provided with a reception side fault detecting section 24 which is capable of detecting a fault or trouble from the received ATM and further of supplying the detected fault information to the transmitting unit 1 (band measuring and controlling section 13).

Figure 13:
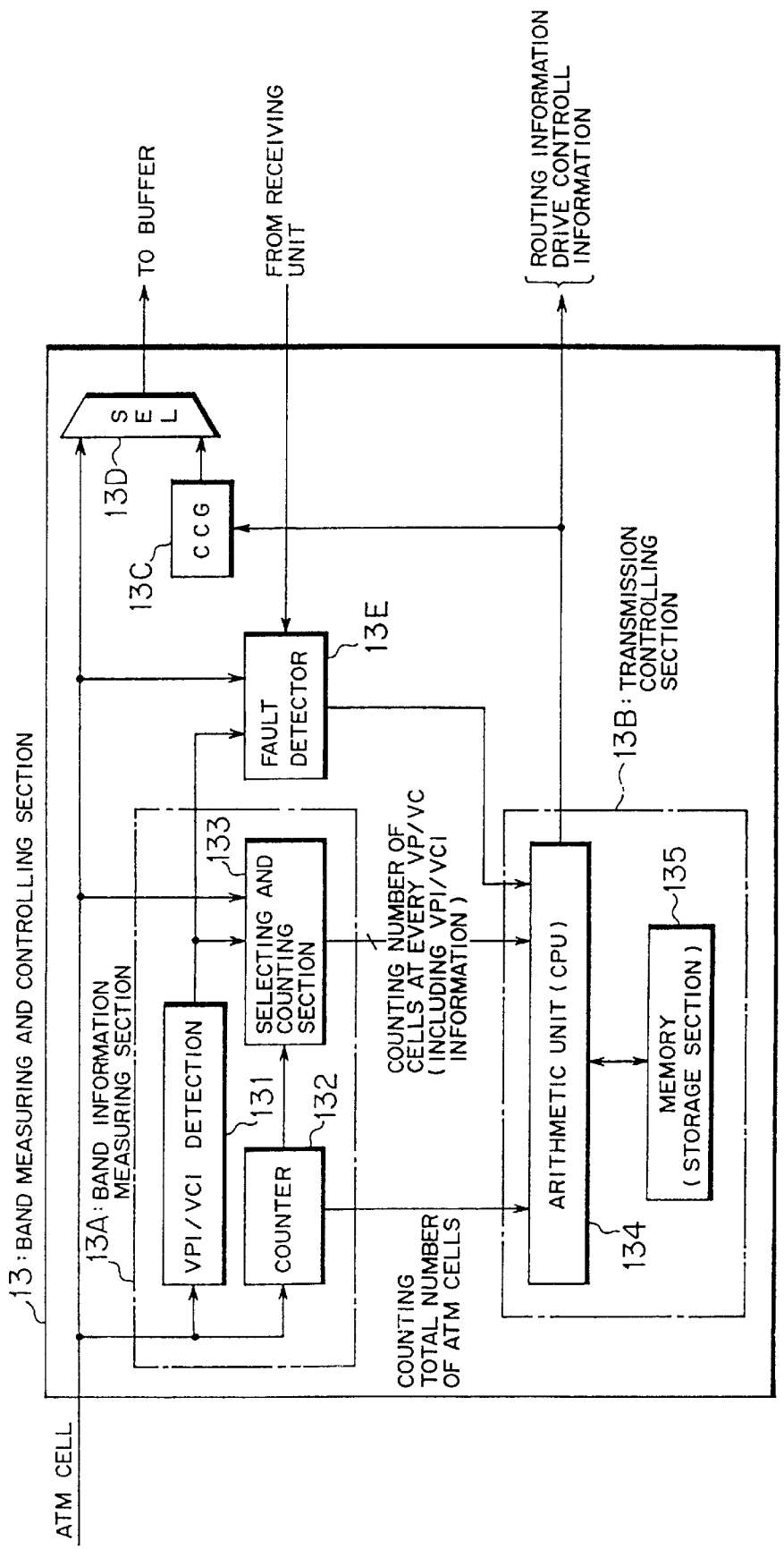
FIG. 13 is a block diagram showing an arrangement of a band measuring and controlling section in the ATM cell transmission system according to the fourth embodiment.

For this reason, as shown in FIG. 13, for example, the band measuring and controlling section 13 of the transmitting unit 1 comprises, in addition to the arrangement in FIG. 3, a transmission side fault detector 13E which detects a fault from the inputted ATM cell and further receives the fault information from the aforesaid fault detecting section 24, and upon the detection of the fault by the transmission side fault detector 13E, the fault information is forwarded to the arithmetic unit 134 which in turn, reproduces drive control information and routing information to drive an optical transmitting section 12-p, which is not put to use, in place of the optical transmitting section 12-p under use involved in that fault.

That is, the ATM cell transmission system (transmitting unit 1) according to this embodiment is designed so that, of the plurality of optical transmitting sections 12-p, an optical transmitting section 12-p free from operation is employed as a spare optical transmitting section at fault occurrence.

Thus, in the transmitting unit 1, even if the function of the optical transmitting section 12-p is destroyed for the occurrence of any fault, the spare optical transmitting section (an optical path free from use) is placed into operation instead of that optical transmitting section 12-p (optical path), and therefore the transmission processing can normally continue, which greatly contributes to improved reliability on the operation of this system.

Incidentally, even in this embodiment, the optical transmission line 3 can also be constructed as a spatial multiplexing transmission line 3' as mentioned referring to FIG. 8.

(b-5) Description of Fifth Embodiment

Figure 14:
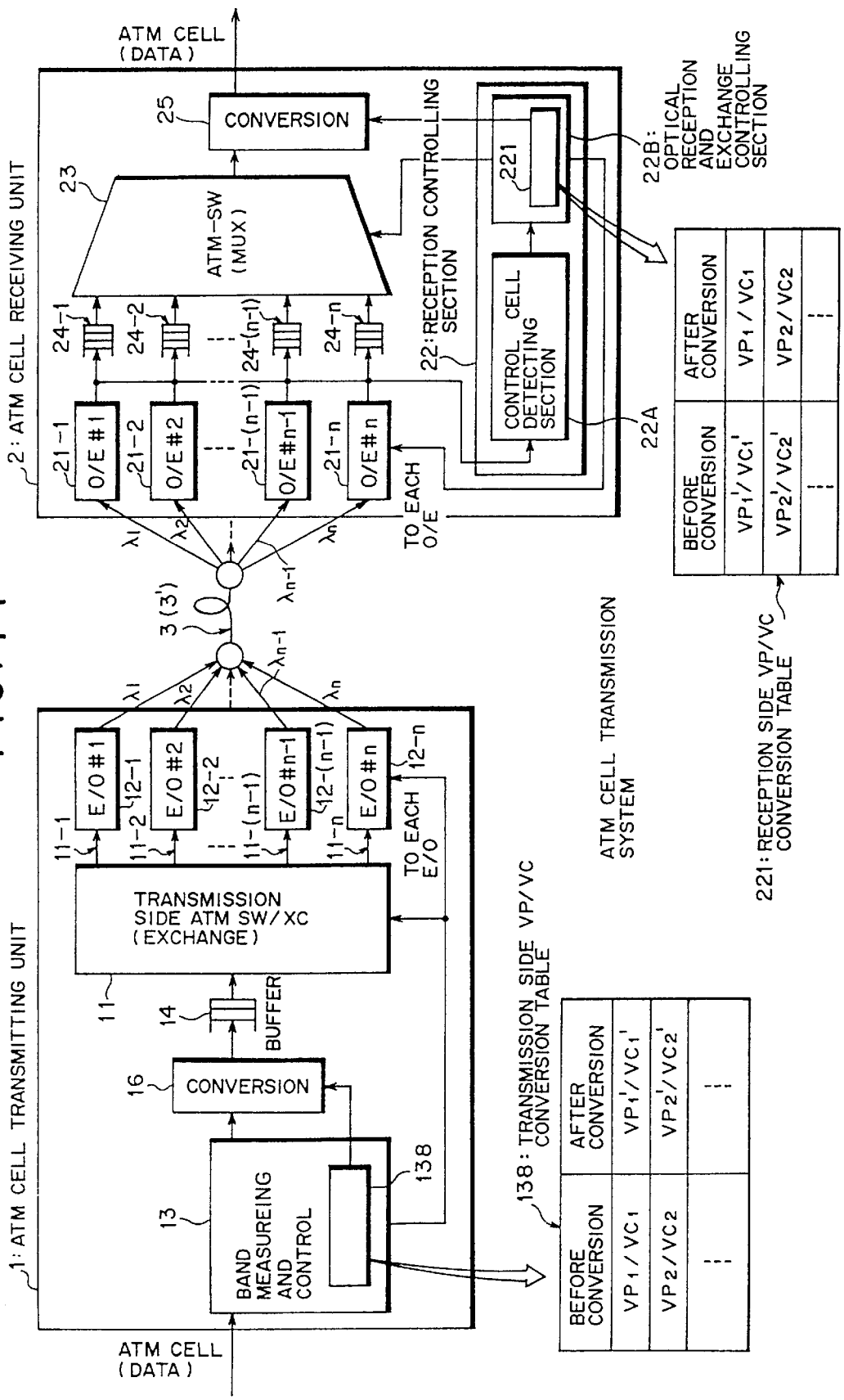
FIG. 14 is a block diagram showing an arrangement of an ATM cell transmission system according to a fifth embodiment of this invention.
Figure 15:
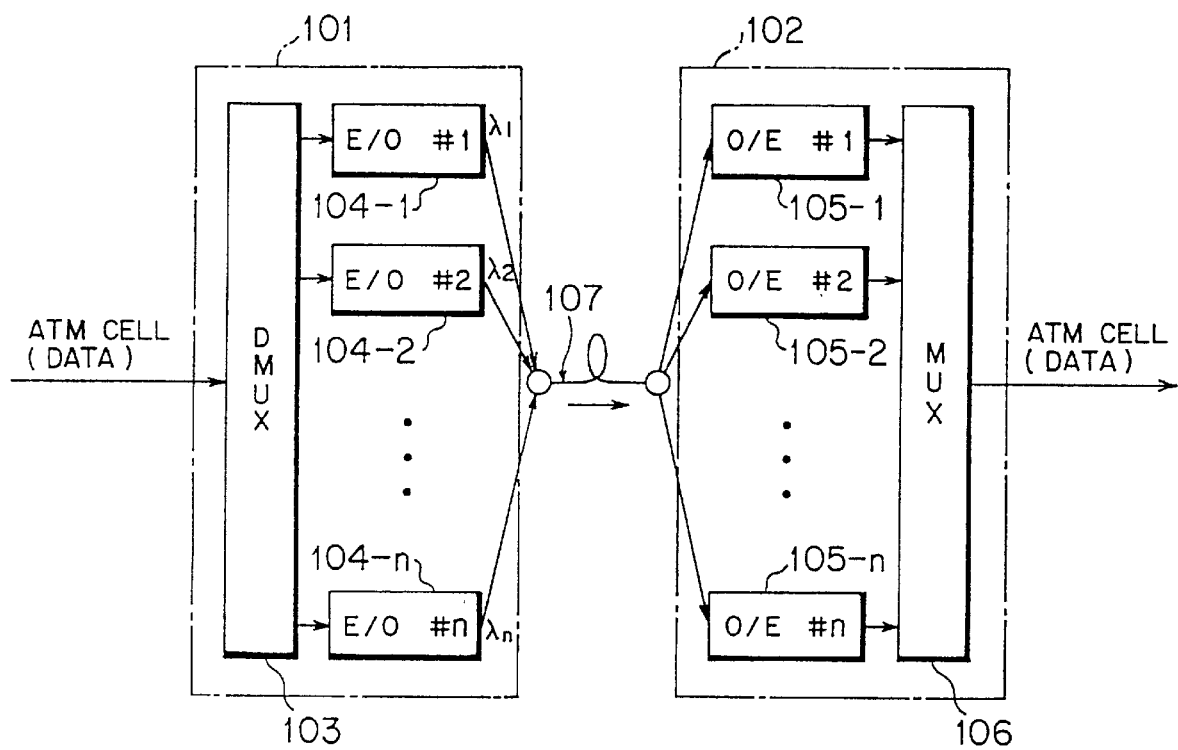
FIG. 15 is a block diagram showing one example of ATM cell transmission system.

FIG. 14 is a block diagram showing an arrangement of an ATM cell transmission system according to a fifth embodiment of the present invention. In the ATM cell transmission system according to this embodiment, in addition to the arrangement according to the first embodiment (see FIG. 2), as shown in FIG. 14, the transmitting unit 1 includes a transmission side VP/VC conversion section 16 and a transmission side VP/VC conversion table 138 and the receiving unit 2 has a reception side VP/VC conversion section 25 and a reception side VP/VC conversion table 221.

In this arrangement, in the transmission side VP/VC conversion table 138, for example as shown in an enlarged portion of FIG. 14, the mapping (correspondence) is made such that the VP/VC values of the inputted ATM cells undergo the conversion of $VP_1 (VC_1) \rightarrow VP_1' (VC_1')$, $VP_2 (VC_2) \rightarrow VP_2' (VC_2')$, . . . , and the transmission side VP/VC conversion section 16 replaces the header (tag information) of the inputted ATM cell on the basis of the table 138 so that the VP/VC value of the ATM cell is converted into the aforesaid given value. This transmission side VP/VC conversion table 138 is stored in the memory 135 (see FIG. 3) of the band measuring and controlling section 13.

On the other hand, the reception side VP/VC conversion table 221 is for returning the VP/VC value of the ATM cell converted in the transmission side to the original value. For instance, as shown in an enlarged portion of FIG. 14, contrary to the transmission side table 138, the mapping is drawn such that the VP/VC values of the received ATM cells experience the conversion of $VP_1' (VC_1') \rightarrow VP_1 (VC_1)$, $VP_2' (VC_2') \rightarrow VP_2 (VC_2)$, . . . , Furthermore, the reception side VP/VC conversion section 25 replaces the header of the received ATM cell on the basis of the table 221, so that the VP/VC value of the ATM cell is converted into the original value and the ATM cell gets into an output-allowable condition.

That is, in the ATM cell transmission system according to this embodiment, the transmitting unit 1 alters the logical channel information of the ATM cell to carry out the exchange in the transmission side ATM SW/XC section 11, while the receiving unit 2 changes the altered logical channel information to the original logical channel information.

In the case of the transmission system thus arranged according to this embodiment, the set values in the respective tables 138, 221 are arbitrarily defined, thereby independently and freely setting the operating VP/VC of the ATM cell between the transmitting unit 1 and the receiving unit 2 within the transmission system. Accordingly, the system according to this embodiment can provide the same effects as those of the systems according to the first to fourth embodiments, besides it is expectable that the system is applicable to the existing transmission systems.

Incidentally, the aforesaid VP/VC conversion sections 16, 25 and the aforementioned conversion tables 138, 221 are also applicable to the transmission systems according to the first to fourth embodiments. In addition, even in this embodiment, the optical transmission line 3 can also be made as being a spatial multiplexing transmission line 3' as mentioned referring to FIG. 8.

(c) Others

Although in the above-described embodiments the ATM cell transmission system is equipped with both the ATM cell transmitting unit 1 and ATM cell receiving unit 2, for example, it is also appropriate that the system is provided with only the transmitting unit 1 to be constructed as a system dedicated to transmission, or that the system includes only the receiving unit 2 to be constructed as a reception-dedicated system. Thus, in this case, the applicable range of this system to the transmission system becomes wide and the flexibility on the system construction sharply improves.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A fixed length cell transmission system comprising:
    a fixed length cell transmitting unit including
        an exchange section receiving a fixed-length cell in the form of an electric signal to output said fixed-length cell to any one of a plurality of exit ports,
        a plurality of optical transmitting sections coupled to said exit ports of said exchange section to convert said fixed-length cell being an electric signal into an optical signal and to output said optical signal, and
        a band measuring and controlling section having a band information measuring section measuring band information from said fixed-length cell being an electric signal inputted and a transmission controlling section determining at least one, to be put to use, of said plurality of optical transmitting sections on the basis of the measurement result by said band information measuring section, driving the determined optical transmitting section, and outputting said fixed-length cell, inputted to said exchange section, to said exit port which is in connection with said optical transmitting section to be put to use; and
    a fixed-length cell receiving unit coupled through an optical transmission line to said fixed-length cell transmitting unit, including
        a plurality of optical receiving sections converting said fixed-length cell, converted into an optical signal in said optical transmitting section into an electric signal and outputting the converted electric signal, and
        a reception controlling section driving said optical receiving section corresponding to said optical transmitting section to be put to use on the basis of information about said optical transmitting section to be put to use in said fixed-length cell transmitting unit, said information being transmitted from said fixed-length cell transmitting unit.

2. A fixed-length cell transmission system as defined in claim 1, wherein said fixed-length cell transmitting unit is arranged so that a control cell having information about said optical transmitting section to be put to use is transmitted to said fixed-length cell receiving unit.

3. A fixed-length cell transmission system as defined in claim 2, further comprising a control transmission line dedicated to transmission of said control cell and interposed between said fixed-length cell transmitting unit and said fixed-length cell receiving unit.

4. A fixed-length cell transmission system as defined in claim 1, further comprising a buffer provided on an input side of said exchange section of said fixed-length cell transmitting unit to accumulate the incoming fixed-length cells.

5. A fixed-length cell transmission system as defined in claim 1, wherein said fixed-length cell transmitting unit changes logical channel information of said fixed-length cell and conducts an exchange operation in said exchange section, whereas said fixed-length cell receiving unit has means to return the changed logical channel information to the original logical channel information.

6. A fixed-length cell transmission system as defined in claim 1, wherein said fixed-length cell transmitting unit is arranged so that at least one, free from use, of said plurality of optical transmitting sections is allowed to be used as a spare optical transmitting section at fault occurrence.

7. A fixed-length cell transmission system as defined in claim 1, wherein said fixed-length cell receiving unit drives the corresponding optical receiving section on the basis of information about said optical transmitting section to be put to use in said fixed-length cell transmitting unit, said information being transmitted from said fixed-length cell transmitting unit.

8. A fixed-length cell transmission system as defined in claim 1, wherein said optical transmission line put between said fixed-length cell transmitting unit and said fixed-length cell receiving unit is constructed as an optical signal multiplexing transmission line for multiplexing optical signals from said optical transmitting sections.

9. A fixed-length cell transmission system as defined in claim 1, wherein said optical transmission line put between said fixed-length cell transmitting unit and said fixed-length cell receiving unit is constructed as a spatial multiplexing transmission line comprising a plurality of optical transmission lines each of which transmits an optical signal from each of said optical transmitting sections.

10. A fixed-length cell transmission unit comprising:
    an exchange section receiving a fixed-length cell in the form of an electric signal to output said fixed-length cell to any one of a plurality of exit ports;
    a plurality of optical transmitting sections coupled to said exit ports of said exchange section to convert said fixed-length cell being an electric signal into an optical signal; and
    a band measuring and controlling section having a band information measuring section measuring band information from said fixed-length cell being an electric signal inputted, and a transmission controlling section determining at least one, to be put to use, of said plurality of optical transmitting sections on the basis of the measurement result by said band information measuring section, driving said optical transmitting section to be put to use, and outputting said fixed-length cell, inputted to said exchange section, to said exit port which is in connection with said optical transmitting section to be put to use, wherein said transmission controlling section outputs a drive control signal to drive the optical transmitting unit to the corresponding optical transmitting section to be put to use, and a routing control signal to said exchange section so that said fixed-length cell inputted to said exchange section is sent to said exit port which is in connection with said optical transmitting section to be put to use.

11. A fixed-length cell transmitting unit as defined in claim 10, wherein said band information measuring section is composed of a whole operating band information measuring section for measuring entire operating band information from said fixed-length cell being an electric signal inputted and a logical channel operating band information measuring section for measuring operating band information at every logical channel said fixed-length cell takes.

12. A fixed-length cell transmitting unit as defined in claim 11, wherein said whole operating band information measuring section includes a counter for counting said fixed-length cells, and said logical channel operating band information measuring section includes:
    a logical channel information detecting section for detecting logical channel information; and a plurality of counters for counting said fixed-length cells having the same logical channel information on the basis of said logical channel information detected in said logical channel information detecting section.

13. A fixed-length cell transmitting unit as defined in claim 10, wherein said band information measuring section includes:
- a whole operating band information measuring section for measuring whole operating band information from said fixed-length cell inputted as an electric signal; and
- a logical channel operating band information measuring section for measuring operating band information at every logical channel said fixed-length cell takes, and said transmission controlling section includes:
- a use number determining section for determining said optical transmitting section to be put to use, from among said plurality of optical transmitting sections on the basis of the measurement result in said whole operating band information measuring section;
- a storage section for storing operating band information corresponding to a logical channel on the basis of the measurement result in said logical channel operating band information measuring section at every optical transmitting section to be put to use;
- a drive control signal outputting section for reading out the stored information from said storage section to output said drive control signal; and
- a routing control signal outputting section for reading out the stored information from said storage section to output said routing control signal.

14. A fixed-length cell transmitting unit as defined in claim 10, wherein said transmission controlling section outputs a non-driving control signal to said optical transmitting section, free from use, of said plurality of optical transmitting sections.

15. A fixed-length cell transmitting unit as defined in claim 10, further comprising a buffer disposed on an input side of said exchange section to accumulate the incoming fixed-length cells.

16. A fixed-length cell receiving unit coupled through an optical transmission line to a fixed-length cell transmission unit which includes a plurality of optical transmitting sections converting a fixed-length cell being an electric signal into an optical signal and outputting the converted optical signal and which measures band information from said fixed-length cell inputted as an electric signal, and determines at least one, to be put to use, of said plurality of optical transmitting sections on the basis of the measurement result and further drives said optical transmitting section to be put to use, said fixed-length cell receiving unit comprising:
- a plurality of optical receiving sections converting a fixed-length cell of an optical signal into an electric signal and outputting the converted electric signal; and
- a reception controlling section driving said optical receiving section corresponding to said optical transmitting section to be put to use in said fixed-length cell transmitting unit on the basis of information about said optical transmitting section to be put to use in said fixed-length cell transmitting unit, said information being transmitted from said fixed-length cell transmitting unit.

17. A fixed-length cell receiving unit as defined in claim 16, wherein said reception controlling section detects a control cell having the information about said optical transmitting section to be put to use in said fixed-length cell transmitting unit, said control cell coming from said fixed-length cell transmitting unit, and further said reception controlling section drives the corresponding optical receiving section.

* * * * *

UNITED STATES PATENT AND TRADEMARK OFFICE
CERTIFICATE OF CORRECTION

PATENT NO.:    6,069,892
DATED     :    May 30, 2000
INVENTOR(S):   Yuji TOCHIO

It is certified that errors appears in the above-identified patent and that said Letters Patent is hereby corrected as shown below:

Col. 22, Line 6, change "transmission" to --transmitting--.

Signed and Sealed this

Twenty-fourth Day of April, 2001

Attest:

NICHOLAS P. GODICI

Attesting Officer    Acting Director of the United States Patent and Trademark Office